US010934181B2

(12) United States Patent
Constantz

(10) Patent No.: US 10,934,181 B2
(45) Date of Patent: Mar. 2, 2021

(54) SYSTEMS AND METHODS FOR APPLYING POWER GENERATION UNITS IN WATER DESALINATION

(71) Applicant: DeepWater Desal LLC, Moss Landing, CA (US)

(72) Inventor: Brent R. Constantz, Portola Valley, CA (US)

(73) Assignee: DeepWater Desal LLC, Moss Landing, CA (US)

( * ) Notice: Subject to any disclaimer, the term of this patent is extended or adjusted under 35 U.S.C. 154(b) by 107 days.

(21) Appl. No.: 14/852,271

(22) Filed: Sep. 11, 2015

(65) Prior Publication Data
US 2016/0076511 A1    Mar. 17, 2016

Related U.S. Application Data

(60) Provisional application No. 62/051,219, filed on Sep. 16, 2014.

(51) Int. Cl.
*C02F 1/44* (2006.01)
*B01D 61/10* (2006.01)
(Continued)

(52) U.S. Cl.
CPC .............. *C02F 1/441* (2013.01); *B01D 61/10* (2013.01); *C02F 1/265* (2013.01);
(Continued)

(58) Field of Classification Search
CPC ...... C02F 1/265; C02F 1/441; C02F 2103/08; C02F 2303/10; B01D 61/10;
(Continued)

(56) References Cited

U.S. PATENT DOCUMENTS 5,979,363 A    11/1999 Shaar
6,833,056 B1   12/2004 Kamiya et al.
(Continued)

FOREIGN PATENT DOCUMENTS

GB    1260214 A    1/1972
GB    2400603 A    10/2004
(Continued)

OTHER PUBLICATIONS

"A case study and critical assessment in calculating power usage effectiveness for a data centre", Brady, etc alEnergy Conversion and Management 76 (2013) 155-161.*
(Continued)

*Primary Examiner* — Krishnan S Menon
(74) *Attorney, Agent, or Firm* — Peter W. Schroen; Bret E. Field; Bozicevic, Field & Francis LLP

(57) ABSTRACT

The subject disclosure provides systems for electric power generation and water desalination. In certain aspects, the systems include a power generation unit such as a reciprocating generator or fuel cell having a water cooling subsystem configured to receive cool water and output warm water and a water desalination plant co-located with the power generation unit and configured to receive and desalinate the warm water. Aspects of the invention also include methods for cooling a power generation unit using a water cooling subsystem and desalinating water with a desalination plant that is co-located with the power generation unit.

20 Claims, 2 Drawing Sheets

(51) Int. Cl.
*C02F 1/26* (2006.01)
*C02F 103/08* (2006.01)
*H01M 8/04029* (2016.01)

(52) U.S. Cl.
CPC ...... B01D 2311/20 (2013.01); B01D 2311/26 (2013.01); B01D 2313/365 (2013.01); C02F 2103/08 (2013.01); C02F 2303/10 (2013.01); H01M 8/04029 (2013.01); Y02A 20/131 (2018.01); Y02W 10/30 (2015.05)

(58) Field of Classification Search
CPC .......... B01D 2313/365; B01D 2311/20; B01D 2311/26; H01M 8/04029; Y02W 10/30; Y02A 20/131; Y02E 60/50
See application file for complete search history.

(56) References Cited

U.S. PATENT DOCUMENTS

| | | | |
|---|---|---|---|
| 7,525,207 | B2 | 4/2009 | Clidaras et al. |
| 7,886,537 | B2 | 2/2011 | Jagusztyn et al. |
| 8,322,139 | B2 | 12/2012 | Takahashi et al. |
| 8,567,195 | B2 | 10/2013 | Nash |
| 2004/0206681 | A1* | 10/2004 | Gordon ................ B01D 61/025 210/259 |
| 2007/0131534 | A1 | 6/2007 | Capan |
| 2009/0078401 | A1 | 3/2009 | Cichanowicz |
| 2009/0230686 | A1 | 9/2009 | Catlin |
| 2009/0295167 | A1* | 12/2009 | Clidaras ................ F03B 13/20 290/55 |
| 2010/0237015 | A1 | 9/2010 | Voutchkov |
| 2012/0011849 | A1 | 1/2012 | Cole et al. |
| 2012/0055857 | A1 | 3/2012 | Marin et al. |
| 2012/0091729 | A1 | 4/2012 | Nash |
| 2012/0247149 | A1 | 10/2012 | Labelle |
| 2013/0042612 | A1 | 2/2013 | Shapiro et al. |

FOREIGN PATENT DOCUMENTS

| | | |
|---|---|---|
| JP | 2010-267707 A | 11/2010 |
| KR | 1000954233 B1 | 4/2010 |
| KR | 10-2011-0037589 | 4/2011 |
| KR | 10-2011-0075384 | 7/2011 |
| WO | WO2011005129 A2 | 1/2011 |
| WO | WO2011047482 A1 | 4/2011 |
| WO | WO2013184820 A1 | 12/2013 |
| WO | WO2014151044 A1 | 9/2014 |
| WO | WO2014151058 A1 | 9/2014 |

OTHER PUBLICATIONS

Gupta et al, Chapter 10, "Natural Gas Fired Reciprocating Engines for Power Generation: Concerns and Recent Advances," <<http://dx.doi.org/10.5772/45992>> Oct. 31, 2012.*
Fuel Cycle Comparison of Distributed Power Generation Technologies, Sandia report, 2008.*
Briand, Effects of power-plant cooling systems on marine phytoplankton, Marine Biology (1975), 33(2):135-146, Abstract Only.
Emura et al., Pumping of Low-Temperature Deep Sea Water for Cooling of Facilities on Land, OCEANS '83, Proceedings, Aug. 29-Sep. 1, 1983, San Francisco, p. 871-874, Abstract Only.
Nakasone et al., The Application of Deep Sea Water in Japan, UJNR Technical Report No. 28, p. 69-75, Accessed on Jan. 21, 2015.
Smith, The AC of Tomorrow? Tapping Deep Water for Cooling, National Geographic News (2004), http://news.nationalgeographic.com/news/2004/09/0910_040910_deeplake_2.html, 3 pages.
Makai Ocean Engineering, http://www.makai.com/pipelines/ac-pipelines/, 8 pages, Accessed on Jan. 21, 2015.
Once Through Cooling, http://www.healthebay.org/about-bay/current-policy-issues/keeping-animals-healthy/open-ocean-intakes, 2 pages, Accessed on Jan. 16, 2015.
Cooling Power Plants, http://www.world-nuclear.org/info/current-and-future-generation/cooling-power-plants/, 14 pages, Accessed on Jan. 16, 2015.
Power Plants Using Once Through Cooling, http://www.cacoastkeeper.org/programs/healthy-marine-habitats/power-plants-otc, 5 pages, Accessed on Jan. 16, 2015.
Elimelech et al., The future of seawater desalination: energy, technology, and the environment, Science (2011), 333 (6043):712-717.

* cited by examiner

SYSTEMS AND METHODS FOR APPLYING POWER GENERATION UNITS IN WATER DESALINATION

CROSS-REFERENCE TO RELATED APPLICATIONS

Pursuant to 35 U.S.C. § 119 (e), this application claims priority to the filing date of the U.S. Provisional Patent Application Ser. No. 62/051,219 filed Sep. 16, 2014; the disclosure of which application is herein incorporated by reference.

INTRODUCTION

In recent years, electrical power consumption in the United States has risen significantly. It is estimated that in 2012 alone 3,741 billion kWh of electricity was consumed in the United States. Accordingly, a range of infrastructure solutions for generating and delivering electrical power have been developed and implemented.

For example, many consumers, including companies, have invested in electric power generators which can be employed in addition, or as an alternative, to an electrical grid power supply. Such generators may produce enough electrical energy to power anything from an industrial plant to a full-sized hospital. Such generators can be used as a back-up source of electrical power and are increasingly being employed as the primary or sole source of power for various facilities.

One type of electric power generator which can be employed in addition, or as an alternative, to an electrical grid power supply is a reciprocating or "engine" generator. Another type of generator which can be employed in addition, or as an alternative, to an electrical grid power supply is a fuel cell. Both reciprocating generators and fuel cells can operate to produce electrical energy efficiently in a wide range of locations and conditions while at the same time having a minimal impact on the surrounding environment.

SUMMARY

Systems for electric power generation and water desalination are provided. In certain aspects, the systems include a power generation unit, such as a reciprocating generator or fuel cell, having a water cooling subsystem configured to receive cool water and output warm water and a water desalination plant co-located with the power generation unit and configured to receive and desalinate the warm water. Aspects of the invention also include methods for cooling a power generation unit using a water cooling subsystem and desalinating water with a desalination plant that is co-located with the power generation unit.

In certain aspects of the disclosed systems and methods, a power generation unit co-located with a desalination plant, e.g., a reverse osmosis desalination plant, is the primary source of electric power for the water desalination plant. Accordingly, in certain versions, a power generation unit is not operably connected to a community electrical grid. In addition, in some embodiments, a power generation unit includes one or more reciprocating generator, and/or fuel cell, such as one or more solid oxide fuel cell.

Also, in various embodiments of the disclosed systems and methods, a water cooling subsystem includes a water intake and/or is operably connected to a cool water source, such as an ocean or sea. A water intake, as described herein, may be positioned at a particular depth within a cool water source, such as at a depth of 15 m or more in the cool water source and/or below the photic zone in the cool water source.

Furthermore, in some aspects of the disclosed systems and methods, the systems further comprise a water discharge for discharging brine from the water desalination plant. Such a water discharge may be positioned at a particular depth, such as a depth of 15 m or more, in a body of water.

Systems of the present disclosure, in various instances, include a data center, such as a data center having a temperature control subsystem configured to receive cool water and output warm water. In some embodiments, a water desalination plant and/or power generation unit is co-located with and/or operably connected to a data center and configured to receive and desalinate the output warm water.

In some versions of the disclosed systems, a power generation unit and water desalination plant are configured to produce fewer carbon emissions as compared to the same power generation unit and water desalination plant operating independently. Likewise, in certain aspects, a power generation unit and water desalination plant are configured to use less energy per volume of water desalinated as compared to the same power generation unit and water desalination plant operating independently.

Embodiments of the disclosed systems include systems wherein the power generation unit, the desalination plant and the data center are configured to produce fewer carbon emissions as compared to the same power generation unit, desalination plant and data center operating independently. In addition, in some versions of the subject systems, the power generation unit, the desalination plant and the data center are configured to use less energy per amount of data-center cooling as compared to the same power generation unit, desalination plant and data center operating independently. Furthermore, in some embodiments of the disclosed systems and methods, a data center has a power usage effectiveness (PUE) of less than 2. In some versions, a data center has a power usage effectiveness ranging from 1 to 1.3.

These and other objects, advantages, and features of the disclosed subject matter will become apparent to those persons skilled in the art upon reading the details of the systems, devices and methods as more fully described below.

DETAILED DESCRIPTION

Figure 1:
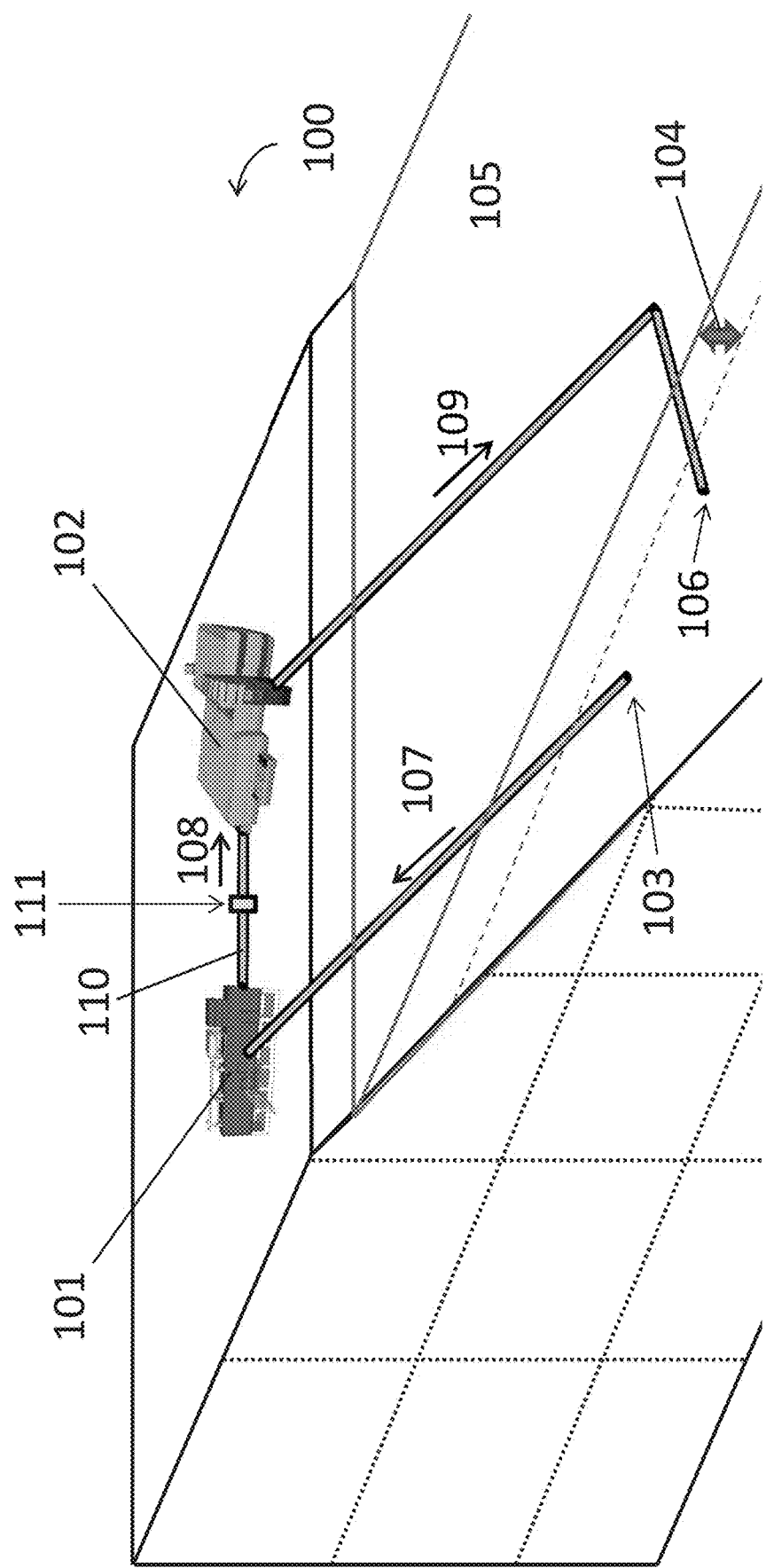
FIG. 1 is a diagram of a system including a power generation unit and water desalination plant co-located with the power generation unit, according to embodiments of the present disclosure.

Systems for electric power generation and water desalination are provided. In certain aspects, the systems include a power generation unit such as a reciprocating generator or fuel cell having a water cooling subsystem configured to receive cool water and output warm water and a water desalination plant co-located with the power generation unit and configured to receive and desalinate the warm water. Aspects of the invention also include methods for cooling a power generation unit using a water cooling subsystem and desalinating water with a desalination plant that is co-located with the power generation unit.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, some potential and exemplary methods and materials may now be described. Any and all publications mentioned herein are incorporated herein by reference to disclose and describe the methods and/or materials in connection with which the publications are cited. It is understood that the present disclosure supersedes any disclosure of an incorporated publication to the extent there is a contradiction.

It must be noted that as used herein and in the appended claims, the singular forms "a", "an", and "the" include plural referents unless the context clearly dictates otherwise. Thus, for example, reference to "an intake" includes a plurality of such intakes and reference to "the material" includes reference to one or more materials and equivalents thereof known to those skilled in the art, and so forth.

It is also noted that definitions provided in one section of this application (e.g., the "Systems" section) may also apply to embodiments described in another section of the application (e.g., the "Methods" section) even if a term is described as applying to an embodiment of a particular section.

It is further noted that the claims may be drafted to exclude any element which may be optional. As such, this statement is intended to serve as antecedent basis for use of such exclusive terminology as "solely", "only" and the like in connection with the recitation of claim elements, or the use of a "negative" limitation.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed. To the extent such publications may set out definitions of a term that conflict with the explicit or implicit definition of the present disclosure, the definition of the present disclosure controls.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

Systems

As summarized above, systems for electric power generation and water desalination are provided. The systems include a power generation unit, e.g., a reciprocating generator and/or a fuel cell, having a water cooling subsystem configured to receive and output water (e.g., cool and warm water, respectively) and a desalination plant co-located with the power generation unit and configured to receive and desalinate the output water (e.g., warm water).

The term "power generation unit", as used herein and described in further detail below, refers to a unit, e.g., a facility, configured to generate electric power. As such, power generation units house components for generating and transmitting electric power. In some instances, a power generation unit includes or is a reciprocating generator and in some variations, a power generation unit includes a fuel cell or is a fuel cell. In various aspects, a power generation unit is disconnected, e.g., not operably connected, or substantially disconnected from an electrical power grid and/or does not transmit electrical power to an electrical power grid.

The term "reciprocating generator", as used herein and described in further detail below, refers to an electric generator including one or more reciprocating aspects, such as a reciprocating engine, e.g., an internal combustion engine. Reciprocating generators may also be configured for on-site electric power generation and may produce electric power in a range, for example, from 1 to 30 megawatts, such as 4 to 20 megawatts, or 5 to 15 megawatts.

The term "fuel cell", as used herein and described in further detail below, refers to a device that converts chemical energy, e.g., chemical energy from a fuel such as hydrogen, into electricity through a chemical reaction, e.g., a chemical reaction with an oxidizing agent, e.g., oxygen.

Likewise, as used herein and described in further detail below, the term "desalination plant" refers to a facility configured and/or used for desalinating water. In some embodiments, desalination plants house components for desalinating water.

The terms "desalinate" and "desalination", as used herein, refer to any of several processes to remove an amount of salt and/or other minerals or components from saline water (i.e., water that contains a concentration of at least one dissolved salt). In some embodiments of the disclosed systems, desalination is removing an amount of salt and/or other minerals or components from saline water so that the water is fit for consumption by a living organism (i.e., a living organism may consume the water and thereby maintain a healthy hydration level and/or a living organism may consume the water without the water having a detrimental effect on the organism's health). In some embodiments of the disclosed systems, desalination makes water potable. In certain embodiments the living organism is a "mammal" or "mammalian", where these terms are used broadly to describe organisms which are within the class mammalia, including the orders carnivore (e.g., dogs and cats), rodentia (e.g., mice, guinea pigs, and rats), and primates (e.g., humans, chimpanzees, and monkeys). In some embodiments, the living organism is a human. The term "human" may include human subjects of both genders and at any stage of development (e.g., fetal, neonates, infant, juvenile, adolescent, adult), where in certain embodiments the human subject is a juvenile, adolescent or adult. In some embodiments of the disclosed systems, desalination is removing an amount of salt and/or other minerals or components from saline water so that the water is fit for a specific purpose (e.g., irrigation).

The terms "co-locate", "co-located" and "co-locating", as used herein refer to placing two or more units (e.g., facilities) in proximity (i.e., within a certain distance). In some aspects of the disclosed systems, co-located units may be located such that they share one or more common aspects (e.g., facilities or components such as specific systems or machinery). In some aspects, co-located units may be located, for example, within 0.1 m; 1 m; 10 m; 100 m; 1,000 m; 10,000 m; or 100,000 m of one another. In various embodiments, co-located units may have a distance between them of 0.1 m or less; 1 m or less; 10 m or less; 100 m or less; 1,000 m or less; 10,000 m or less; or 100,000 m or less. In certain embodiments, co-located units are two or more facilities located on immediately adjacent or abutting areas or parcels of land. In certain embodiments, co-located units are two or more facilities located on the same area of land. In some versions of the disclosed systems, co-located units may be located such that they are in fluid communication (e.g., the units are configured such that at least one fluid may move and/or flow between the units). In certain variations of the disclosed systems, co-located units are located such that they share one or more of the components described herein (e.g., a water cooling subsystem). In certain embodiments of the disclosed systems, co-located units may be located such that they are electrically connected (e.g., connected by at least one conductive material) and/or share at least one electrical component. In particular instances, co-located units are located such that their location allows them to be more energy-efficient (e.g., use less energy, e.g., electrical power, for the same amount of productivity) than the units would be if they were located in a different position (e.g., a greater distance away from each other). In various embodiments, co-located units are located such that their location allows them to produce fewer carbon emissions (e.g., carbon dioxide emissions) or have a smaller carbon footprint than the units would if they were located in a different position (e.g., a greater distance away from each other). In some versions, co-located units are located such that their location allows them to minimize potential pollutants (e.g., thermal pollution) emitted therefrom. In certain embodiments of the disclosed systems, co-located units may be located such that they are operably connected.

By "operably connected" and "operably coupled", as used herein, is meant connected in a specific way (e.g., in a manner allowing water to move and/or electric power to be transmitted) that allows the disclosed system and its various components to operate effectively in the manner described herein. For example, a power generation unit operably connected to a data center may allow electricity to flow (e.g., be transmitted along at least one conductive material) between the power generation unit and the data center such that the energy required to operate the data center would be at least partially obtained from the power generation unit.

The term "data center", as used herein and described in further detail below, refers to a facility configured and/or used for physically housing (e.g., containing within it) one or more computer systems and/or associated components. In certain embodiments, data centers include the components therein and manage, store, process and/or exchange digital information and data.

FIG. 1 provides a diagram of one embodiment of a disclosed system 100 including a power generation unit 101, a water desalination plant 102 co-located with the power generation unit 101, a water intake 103 positioned below the photic zone 104 in a water source 105, a water discharge 106 positioned below the photic zone 104 in a body of water which, in this version, is the same as the water source. In addition, FIG. 1 depicts a possible direction 107 of water movement in the water intake, a possible direction 108 of water movement through an operable connection 110, and a possible direction 109 of water and/or brine movement through a water discharge 106. FIG. 1 also depicts an operable connection 110 (e.g., a connection through which water may move and/or electric power may be transmitted) between the power generation unit 101 and the desalination plant 102, and a coupling component (111), as well as other components and aspects described further below.

Figure 2:
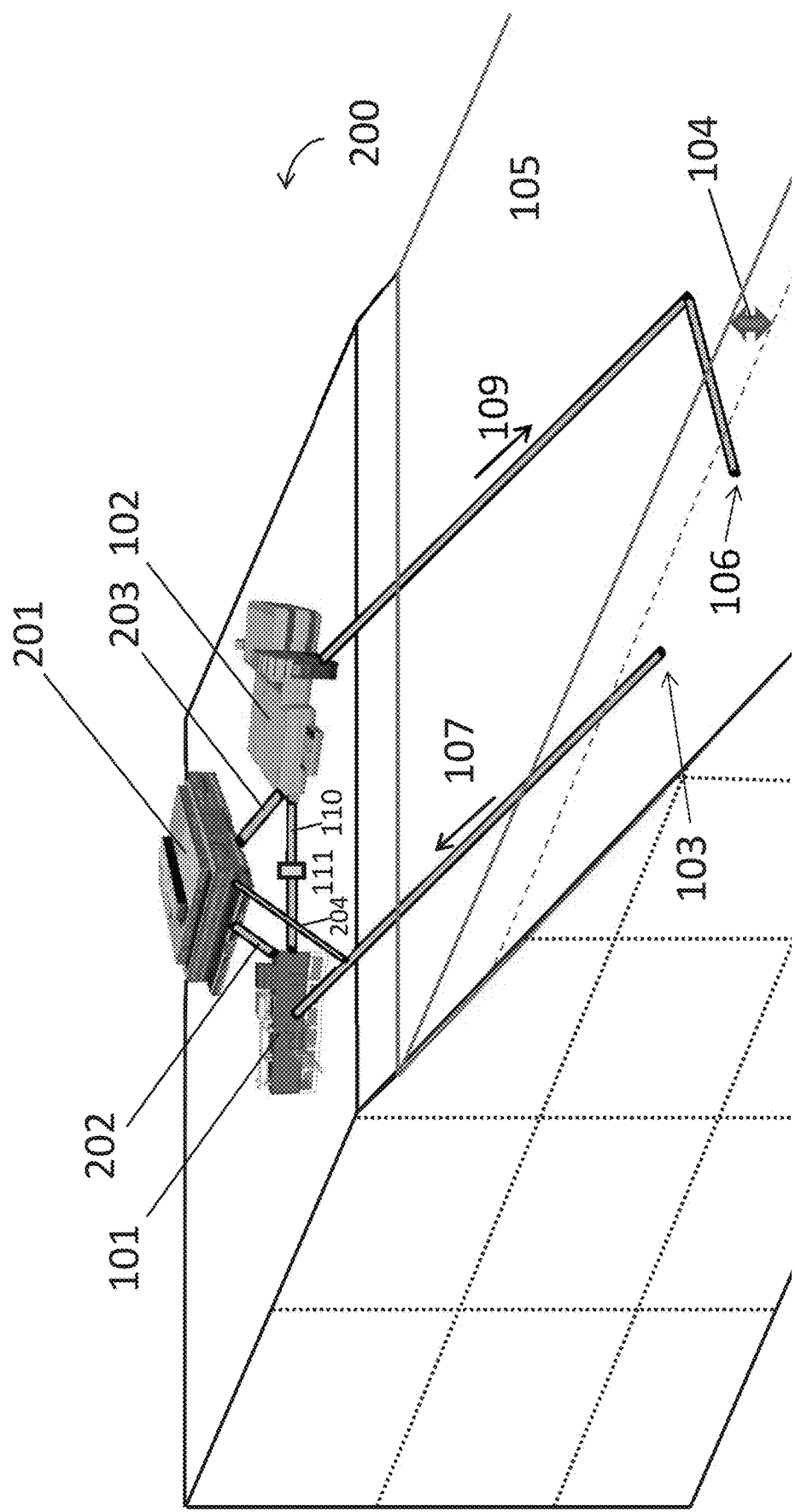
FIG. 2 is a diagram of a system including a power generation unit and water desalination plant co-located with each other and with a data center, according to embodiments of the present disclosure.

In certain instances, and as depicted by the diagram of FIG. 2, a subject system 200 may include many of the same components and aspects illustrated in FIG. 1, including a power generation unit 101, a water desalination plant 102 co-located with the power generation unit, and may also include a data center 201 co-located with the power generation unit and the water desalination plant. FIG. 2 also illustrates operable connections 202, 203 (e.g., connections through which water may move and/or electric power may be transmitted) between the power generation unit, data center and/or desalination plant, and other components and aspects described herein. FIG. 2 also depicts an operable connection 204, which can optionally be included in some embodiments of the systems, between the data center 201 and the water intake 103.

Various aspects of the embodiments of the systems shall now be described in greater detail below.

Power Generation Unit

The disclosed systems, in some embodiments, include one or more power generation units. A power generation unit includes components for generating and/or transmitting electric power and is configured to output electric power. As noted above, a power generation unit can include one or more reciprocating generator and/or one or more fuel cell.

In various aspects, a power generation unit is not an industrial power station, e.g., a full-scale industrial power station, such as a power station configured to generate electric power in a large amount, e.g., 500 MW or more, 2 gW or more, or 10 gW or more, and/or provide it to an electrical grid electrically connecting a large number, e.g., 100 or more, 1,000 or more, or 10,000 or more, residential, commercial, and/or industrial units. In some variations, power generation units are configured to produce, for example, 500 kW or less, 1000 kW or less, 2 MW or less, 5 MW or less, 10 MW or less, or 100 MW or less, of electric power, e.g., prime and/or continuous power. In some versions, power generation units, such as reciprocating generators and/or fuel cells are operably connected, e.g., connected in series, to one another. Such an arrangement may produce more electrical power than a single power generation unit operating independently. A plurality of operably connected power generation units may include, for example, 2 or less, 5 or less, 10 or less, 100 or less, or 1000 or less, power generation units.

In various aspects, a power generation unit, or an aspect thereof, such as one or more reciprocating generators and/or fuel cells, is disconnected, e.g., not operably connected, e.g., not electrically connected, or substantially disconnected from an electrical power grid, e.g., a community electrical grid, and/or does not transmit electrical power to an electrical power grid e.g., a community electrical grid. By "community electrical grid" is meant an electrical network for supplying electrical power to a community of consumers, such as 100 or more, 1,000 or more, or 10,000 or more, residential, commercial, and/or industrial power consuming units. A power generation unit substantially disconnected from an electrical power grid may have a minimal electrical connection to the power grid and/or not be configured to transfer a large amount, e.g., 10% or more, 50% or more, or 90% or more of the power generation unit's total potential electrical output, of electrical power to and/or from the grid. In some aspects a power generation unit, e.g., a power generation unit substantially disconnected from an electrical power grid, may not have a direct operable, e.g., electrical, connection to a power grid but may have an operable, e.g., electrical, connection to a power grid via a separate facility, e.g., a desalination plant and/or a data center, which is operably connected to, and/or co-located with, the power generation unit.

Some versions of power generation units are not full facilities but are instead housed inside of or adjacent to facilities having equipment therein configured primarily for an operation other than producing electrical power. Such a facility may be, for example, a desalination plant, data center, and/or a manufacturing plant for producing materials and/or parts. As is discussed further below, power generation units, or aspects thereof, such as reciprocating generators and/or fuel cells, may also be co-located with one or more of such facilities.

In various embodiments, power generation units generate electrical power from fossil fuels, e.g., coal, oil, and/or natural gas, nuclear power or renewable energy sources, e.g., wave, tidal, wind and/or solar sources. In certain aspects, power generation units may provide electric power to users of electric power outside the power generation unit.

Some embodiments of power generation units produce carbon emissions. In certain instances, power generation units (e.g., power generation units operating to produce electric power independently) produce an amount of carbon emissions for each function or portion of a function performed by a power generation unit or components thereof. For example, in some embodiments, power generation units produce a certain amount of carbon emissions per amount of electrical power produced. Additionally, various embodiments of power generation units do not produce carbon emissions.

In various instances, power generation units include a receiver for receiving one or more materials, e.g., fossil fuels such as coal and/or oil, and/or energy into a power generation unit. In some aspects, power generation units include at least one conversion element for converting the materials and/or energy received into the receiver to electric power. In certain instances, power generation units include an electrical yield component configured for providing an output of electrical power from the power generation unit. In various embodiments, power generation units include one or more control systems configured for controlling the amount of materials and/or energy received into a receiver and/or for controlling the amount of materials and/or energy converted to electric power and/or for controlling the amount of electric power output from the power generation unit via, for example, the electrical yield component. In some instances, control systems may include one or more central processing unit (CPU) and/or one or more user interface and/or one or more display.

In some embodiments, power generation units include electrical components. For example, power generation units may include temperature and/or lighting control systems as well as electrical components for electrically connecting entities using electrical power to the power generation unit, e.g., power lines and/or transformers. In certain instances, power generation units (e.g., power generation units operating independently) use an amount of energy (e.g., electrical energy) for each amount of electrical power produced.

Certain embodiments of power generation units produce heat. As such, in some embodiments, power generation units include a cooling system. In some instances, cooling systems of power generation units are configured to cool power generation units using cool water (e.g., seawater) and may be included in and/or operably connected to water cooling subsystems, as described herein. In some versions, cooling systems are configured to cool one or more elements of power generation units, such as one or more engines. In certain embodiments, power generation unit cooling systems include an interconnected structure of pipes and/or containers and/or pumps (e.g., pumps as described below) configured for moving water through (e.g., in to and/or out of) the interconnected structure and thereby cooling the power generation unit. In certain versions, power generation units produce and output warm water. In certain aspects, power generation unit cooling systems are operably connected to water discharges (e.g., warm water discharges), as described herein.

As noted above, certain variations of power generation units produce heat. As such, certain versions of power generation units include environmental control systems (e.g., one or more air conditioning units) for controlling at least a portion of the environment with a power generation unit. In some aspects, environmental control systems include the water cooling subsystems described herein. In some aspects, environmental control systems include temperature control systems that are configured to heat and/or cool at least a portion of the power generation units. In some instances, environmental control systems include humidity control systems that are configured to control the amount of humidity in at least a portion of the power generation units. In some aspects, environmental control systems include pressure control systems that are configured to control the pressure level in at least a portion of the power generation units.

In various instances, power generation units, or aspects thereof, such as one or more reciprocating generators and/or fuel cells, include one or more water cooling subsystems. The phrases "water cooling subsystem" and "water cooling subsystems", as used herein, refer to an interconnected structure located, for example, at least partially within a facility, e.g., a power generation unit, that is configured to cool at least one component (e.g., an engine) or portion (e.g., a room) of a facility, e.g., a power generation unit. Where desired, the interconnected structure of a water cooling subsystem includes one or more components (e.g., conduits, such as pipes and/or containers) configured to carry water from one location (e.g., the location of an intake) to another location. In certain embodiments, water cooling subsystems include an intake, such as a conduit, configured for receiving water into the water cooling subsystem. In certain embodiments, water cooling subsystems include a warm water emitter. In some embodiments of warm water emitters, the emitters are operably coupled to a facility, e.g., a desalination plant, and/or include one or more container and/or conduit configured, for example, to convey fluid, e.g., warm water, out of a power generation unit. In some embodiments, water cooling subsystems are water-tight except for an intake for receiving water into the subsystems and warm water emitter for discharging water out of the subsystems. The water cooling subsystem, in some instances, may be operably coupled, e.g., fluidically coupled, to a water (e.g., cool water) source, such as an ocean and/or sea and/or river and/or lake and/or groundwater source and/or other water source. In some versions, a water cooling subsystem may be configured to receive or withdrawn water (e.g., cool water) from an ocean and/or sea and/or river and/or lake and/or groundwater source and/or other water source.

The term "water", as used herein, refers to the chemical compound having the chemical formula $H_2O$. Water may also be salt water (e.g., seawater) and as such may include one or more components (e.g., salts) dissolved therein. Salt water (e.g., seawater) may have a salinity of about 3.5% (35 g/L, or 599 mM) (e.g., a salinity of 3.4% to 3.6% or 3.1% to 3.8%). Water may also be in the form of a liquid and/or gas.

Water, as described in the application, may also have a variety of different temperatures. By "cool" water, as used herein, is meant water that has a lower temperature than "warm" water, as described herein. In some aspects the temperature of cool water is within the range 1° C. to 35° C. For example, in some instances the temperature of cool water is within one of the following ranges: 5° C. to 30° C., 10° C. to 25° C. or 15° C. to 20° C. In particular aspects, the temperature difference between cool water and warm water may range from 1° C. to 99° C. For example, the temperature difference between cool water and warm water may be 1° C. or less; 10° C. or less, 20° C. or less, 50° C. or less, or 90° C. or less. The temperature difference between cool water and warm water may also be, for example, at least 1° C.; at least 2° C.; at least 3° C.; at least 4° C.; at least 5° C.; at least 10° C.; at least 15° C.; at least 20° C.; at least 25° C.; at least 30° C.; at least 35° C.; at least 40° C.; or at least 50° C. In some aspects, cool water may have a temperature within one of the above listed ranges when the cool water enters and/or exits a component of the systems described herein (e.g., a water intake). In some aspects, cool water may have the same temperature as the water source from which the cool water is taken. For example, cool water may have the same temperature as that of the portion of ocean or sea surrounding (e.g., a location at or within a distance of 1 m and/or 10 m and/or 100 m and/or 1000 m) one or more elements of the system disclosed herein (e.g., a water intake and/or a water emitter and/or discharge). In certain aspects of the disclosed systems, the cool water is received into the systems from a cool water source such as an ocean or sea. A cool water source may be operably connected, e.g., fluidically connected, to a water cooling subsystem such that water may flow, for example, from the cool water source into the water cooling subsystem. In some instances, the temperature of cool water increases and/or decreases as the water progresses through the disclosed systems.

By "warm" water, as used herein, is meant water that has a higher temperature than "cool" water, as described herein. In some aspects the temperature of warm water is within the range 36° C. to 100° C. For example, in some instances the temperature of warm water is within one of the following ranges: 36° C. to 90° C.; 45° C. to 75° C.; or 55° C. to 65° C. As noted above, in particular instances, the temperature difference between cool water and warm water may range from 1° C. to 99° C. For example, the temperature difference between cool water and warm water may be, 1° C. or less; 2° C. or less; 3° C. or less; 4° C. or less; 5° C. or less; 10° C. or less; 15° C. or less; 20° C. or less; 25° C. or less; 30° C. or less; 35° C. or less; 40° C. or less; or 50° C. or less. In some aspects, warm water may have a temperature within one of the above listed ranges when the warm water enters and/or exits a component of the systems described herein (e.g., the water discharge). In some aspects, warm water may have a higher temperature than the water source from which the cool water is taken. For example, warm water may have a higher temperature than that of the portion of ocean or sea surrounding (e.g., a location at or within a distance of 1 m and/or 10 m and/or 100 m and/or 1000 m) one or more elements of the system disclosed herein (e.g., a water intake and/or a water discharge). In some embodiments, the temperature of warm water increases and/or decreases as the water progresses through the disclosed systems.

In some aspects, the water cooling subsystem may be configured to carry cool water to at least one location in a power generation unit (e.g., a location where heat is produced by the power generation unit) where the cool water is heated and thereby converted to warm water. Cool water may be heated and converted to warm water within a heat exchange element of a water cooling subsystem, which is described in further detail below. The water cooling subsystem may also, in some instances, be configured to carry warm water away from one location in a power generation unit (e.g., the location of a heat exchange element) to another location (e.g., a location outside a portion of the power generation unit which contains one or more engines, such as combustion engines, and/or associated components). Where desired, the water cooling subsystem is configured to carry heat energy away from one or more engine and/or associated components that generate heat energy by allowing generated heat energy to be transferred to water (e.g. cool water) within the water cooling subsystem (e.g., within a heat exchange element of the water cooling subsystem) and thereafter, transferring the heated water (e.g., warm water) away from the position within the power generation unit where it was heated. By transferring water within a power generation unit and thereby cooling one or more engines and/or associated components within the power generation unit, the water cooling subsystem optimizes the operation of the systems and/or components by providing an environment in which the systems and/or components may effectively operate.

In certain instances, water cooling subsystems include a heat exchange element. In particular embodiments, heat exchange elements are configured to cool one or more locations and/or components within a power generation unit. For example, heat exchange elements may be configured to allow an exchange of heat produced by a power generation unit at a first location to a medium (e.g., air and/or water) and thereafter transfer the heated medium to a second location so that the first location of the power generation unit and/or components at the first location are cooled. In some aspects, heat exchange elements are configured such that a medium (e.g., cool water) may be channeled into the heat exchange element (e.g., from a first portion of the water cooling subsystem) and/or a medium (e.g., warm water) may be channeled out of the heat exchange element (e.g., to a second portion of the water cooling subsystem).

In certain aspects, a heat exchange element is an air conditioning system (e.g., one or more air conditioning units). In some instances, heat exchange elements are configured to cool air around (e.g., in the same room of a power generation unit as power generation unit components) components (e.g., mechanical and/or electrical components) of the power generation unit which produce heat. In some instances, heat exchange elements are configured to allow the transfer of heat from air (e.g., air heated by power generation unit components) around (e.g., in the same room of a power generation unit as power generation unit components) components (e.g., mechanical and/or electrical components) of the power generation unit which produce heat to cool water. Such an exchange will result in the air being cooled and the water being warmed (e.g., to warm water). Accordingly, in some aspects, cool water is heated to warm water within the heat exchange element. In certain instances, heat exchange elements are configured to remove air that has been heated by components of a power generation unit from the area of the power generation unit (e.g., room) in which the components are located.

In certain embodiments, heat exchange elements are one or more channels (e.g., channels having a large interior and/or exterior surface area) physically integrated with components of a power generation unit (e.g., mechanical and/or electronic components which produce heat). Where desired, heat exchange elements are configured such that water may flow through them and thereby transfer heat away from the power generation unit components. In some versions, the heat exchange element is operably connected to the remainder of the water cooling subsystem at one or more locations (e.g., one, two, three, four or five locations). In certain aspects, the heat exchange element is composed of the same materials as the remainder of the water cooling subsystem or different materials. Examples of heat exchange elements or components thereof that may be utilized either wholly or partially in connection with the disclosed systems are provided by U.S. Pat. Nos. 6,062,304; 4,896,830; 3,242,914; 5,746,270; 6,667,122; 6,478,078; 6,877,338; 5,599,217; 5,257,661; 5,427,062; 5,226,594; 7,537,851; 8,034,501; 6,852,435; 6,673,482; 6,374,627; 8,009,430; 7,525,207; 7,347,058; 8,004,832; 7,810,341; 7,808,780; 6,574,104; 6,859,366; 8,157,626; 7,881,057; 6,980,433; 6,945,058; 6,854,284; 6,834,512; 6,775,997; 6,772,604; 8,113,010; 8,276,397; U.S. Patent Application No. U.S. 20100263854; U.S. Patent Application No. US 20130022432; U.S. Patent Application No. US 20050179261; U.S. Patent Application No. US 20070114005; U.S. Patent Application No. US 20070277960; U.S. Patent Application No. US 20130031895; U.S. Patent Application No. US 20030056737; U.S. Patent Application No. U.S. 20130236804; U.S. Patent Application No. U.S. 20030203258; U.S. Patent Application No. US 20120235419; U.S. patent application Ser. No. 12/531,215; U.S. patent application Ser. No. 13/372,100; U.S. patent application Ser. No. 12/844,658; U.S. patent application Ser. No. 12/873,909; U.S. patent application Ser. No. 12/264,648; and U.S. patent application Ser. No. 12/332,708, the disclosures of each which are incorporated by reference herein.

As noted above, in certain embodiments, water cooling subsystems include a warm water emitter. In various instances, warm water emitters are operably connected (e.g., attached in a water-tight manner) to one or more other facility, e.g., desalination plants and/or power generation units. In some versions, warm water emitters are part of the same structure as the coupling components described herein. Where desired, warm water emitters expel warm water out of a water cooling subsystem and/or into a cool water source or body of water. In some embodiments, warm water emitters include one or more openings through which warm water may move (e.g., flow). In certain embodiments, a warm water emitter is a pipe and may be made of the same and/or different materials and/or types of materials as the water intakes described herein. In certain versions, a warm water emitter is positioned inside or outside a portion of the power generation unit which contains one or more engines and/or associated components.

The disclosed water cooling subsystems, in certain embodiments, include a water intake. In some aspects, the water intake includes one or more openings (e.g., holes, gaps and/or slits) in the water cooling system configured to receive water (e.g., cool water) into the water cooling subsystem. For example, the water intake may be one or more pipes having one or more (e.g., one, two, three, four, five, six, seven, eight, nine, or ten or more) openings (e.g., an open end) positioned within a body of water such that water may flow into the one or more pipes. In some embodiments, a water intake or an opening therein is shaped as a circle, rectangle, square, slit, polygon, quadrilateral, oval, semi-circle, or other shape. In certain instances, a water intake or an opening therein may have a single defined radius of symmetry. In some versions, a water intake or an opening therein may radii of curvature lying within a single plane (e.g., a vertical plane or a horizontal plane).

In certain embodiments, water intakes (e.g., one or more openings in water intakes) are configured to intake or otherwise have an amount of water (e.g., seawater) move through them in a set time period (e.g., a minute or hour or day). For example, water intakes may be configured to intake up to: 5,000 L/day; 10,000 L/day; 15,000 L/day; 20,000 L/day; 25,000 L/day; 30,000 L/day; 35,000 L/day; 40,000 L/day; 45,000 L/day; 50,000 L/day; 55,000 L/day; 60,000 L/day; 65,000 L/day; 70,000 L/day; 75,000 L/day; 80,000 L/day; 85,000 L/day; 90,000 L/day; 95,000 L/day; 100,000 L/day; 150,000 L/day; 200,000 L/day; 250,000 L/day; 300,000 L/day; 350,000 L/day; 400,000 L/day; 450,000 L/day; 500,000 L/day; 550,000 L/day; 600,000 L/day; 650,000 L/day; 700,000 L/day; 750,000 L/day; 800,000 L/day; 850,000 L/day; 900,000 L/day; 950,000 L/day; 1 million L/day; 5 million L/day; 10 million L/day; 20 million L/day; 30 million L/day; 40 million L/day; 50 million L/day; 60 million L/day; 70 million L/day; 80 million L/day; 90 million L/day; 100 million L/day; 110 million L/day; 120 million L/day; 130 million L/day; 140 million L/day; 150 million L/day; 160 million L/day; 170 million L/day; 180 million L/day; 190 million L/day; 200 million L/day; 220 million L/day; 240 million L/day; 260 million L/day; 280 million L/day; 300 million L/day; 400 million L/day; 500 million L/day; or 1 billion L/day. Water intakes may also be configured to intake more than 1 billion L/day. Water intakes, in particular embodiments, may be configured to intake an amount of water in any of the ranges: 5,000 L/day to 1 billion L/day; 50,000 L/day to 500 million L/day; 1 million L/day to 200 million L/day or 50 million L/day to 100 million L/day. In some aspects, intakes are configured such that the amount of water moving (e.g., flowing) through an intake may be variable within a time period (e.g., one minute, one hour, one day, one month, one year).

In particular aspects, the water intake or a portion thereof is positioned outside the portion of the power generation unit containing the one or more engines and/or associated components. For example, in some variations, the water intake is positioned outside a building housing the one or more engines and/or associated components. Where desired, the intake is in fluid communication with at least one portion of the water cooling subsystem located inside the portion of the power generation unit containing the one or more engines and/or associated components wherein cool water is heated (e.g., heated to warm water).

Embodiments of the water cooling subsystems include a water intake. Such an intake, or a portion thereof, such as a terminal end, may be positioned at a depth of 15 m or more in a cool water source. Intakes may also include one or more conduits, such as on or more pipes, such as one or more pipes having an opening at each end. Some variations of the water cooling subsystems include a water intake and/or at least one opening therein (e.g., an opening, such as a terminal opening, at the end of the intake furthest from the portion of the power generation unit housing components for power generation) positioned at a depth of 1 m or more; 2 m or more; 3 m or more; 4 m or more; 5 m or more; 6 m or more; 7 m or more; 8 m or more; 9 m or more; 10 m or more; 11 m or more; 12 m or more; 13 m or more; 14 m or more; 16 m or more; 17 m or more; 18 m or more; 19 m or more; 20 m or more; 25 m or more; 30 m or more; 35 m or more; 40 m or more; 45 m or more; 50 m or more; 60 m or more; 70 m or more; 80 m or more; 90 m or more; 100 m or more; 200 m or more; and/or 300 m or more in a water source. In some aspects, water cooling subsystems include a water intake and/or at least one opening therein positioned below and/or within a particular zone (e.g., euphotic and/or disphotic, and/or aphotic zone and/or benthic zone) in a water source. Water cooling subsystems, in certain versions, include a water intake and/or at least one opening therein positioned below the photic zone in a cool water source.

In certain aspects wherein a water intake is positioned at a particular depth within a cool water source (e.g., a depth of 15 m or more), its center (e.g., the center-most point of a water intake or a portion thereof, such as a terminal opening) and/or the top edge (e.g., the edge or portion closest to the surface of the water) of the water intake and/or the bottom edge (e.g., the edge or portion furthest from the surface of the water) of the water intake is positioned at that particular depth below the surface of the water. In certain instances, a water intake positioned at a particular depth within a water source may have an opening, such as a terminal opening, wherein the center of the opening (e.g., the center-most point of a circular and/or square opening) and/or the top edge (e.g., the edge or portion closest to the surface of the water) of the opening and/or the bottom edge (e.g., the edge or portion furthest from the surface of the water) of the opening is positioned at that particular depth below the surface of the water.

Embodiments of water cooling subsystems, and in certain versions water intakes, include one or more filters configured for purifying water. In certain instances, at least one filter is located at one or more openings in the intake and/or at the end of the intake furthest from the portion of the power generation unit housing components for generating power and/or related equipment. Where desired, a filter is positioned within the portion of the power generation unit housing components for generating power and/or related equipment.

Water cooling subsystems and/or water intakes thereof may, in various embodiments, be composed of one or more materials or one or more types of materials. Examples of materials that the water cooling subsystems of the disclosed systems may be composed of include polymers, ceramics, metals, glasses and/or a combination thereof. In some instances, the water cooling subsystems are not composed of metal or material that is subject to corrosion (e.g., corrosion by rust). In some embodiments, water cooling subsystems are composed of plumbing materials. For example, water cooling subsystems may be composed of polyvinyl chloride (PVC) pipes and/or joints and one or more adhesives for fastening the pipes in a water-tight manner. Where appropriate, one or more materials of the water cooling subsystems may be rigid. In some aspects, one or more materials of the water cooling subsystems may be flexible (e.g., one or more rubber tubes or hoses). However, these examples of materials are not limiting and the materials of the water cooling subsystems may be any material, or combination of materials, having the structural and chemical properties necessary to function in the disclosed systems as described herein.

The water cooling subsystem, in various instances, includes a pump. In some embodiments, a pump is a means for causing water to move through water cooling subsystems and/or other components (e.g., water intakes; water discharges and/or desalination plants), as described herein. In certain variations, a pump causes water to move unidirectionally or bidirectionally through water cooling subsystems and/or other components (e.g., water intakes; water discharges and/or desalination plants), as described herein. In some instances, a pump is electrically powered and/or fossil fuel powered and/or powered by another means. In certain aspects, a pump is operably connected to a power source (e.g., the power generation unit), as described herein. In particular versions, tides, and/or a pump powered by tides, cause water to move through the water cooling subsystems and/or other components (e.g., desalination plants) described herein. In some embodiments, one or more pumps are located within power generation units and/or desalination plants, as described herein. In certain embodiments, one or more pumps are located outside power generation units and/or desalination plants, as described herein.

In particular aspects, water cooling subsystems include one or more valves within the subsystems for controlling the movement of water through the system. In some embodiments, the valves are controllable (e.g., configured to be opened and/or closed in reaction to a designated signal or action). Where desired, each valve is individually controllable (e.g., a valve may be opened and or closed while other valves are not). In certain embodiments, the one or more valves include electrical components and may be configured to receive an electronic signal from a controller operably connected thereto.

In particular embodiments, power generation units, or aspects thereof, such as reciprocating generators and/or fuel cells, are co-located with one or more other facilities, e.g., data centers and/or desalination plants. Power generation units, or aspects thereof, such as reciprocating generators and/or fuel cells, in certain aspects, are operably connected to a data center and/or a water desalination plant. In some aspects, power generation units may be in fluid communication with a data center and/or a water desalination plant. Where desired, power generation unit cooling systems and/or water cooling subsystems may be attached to a coupling component (e.g., a pipe section) of a water desalination plant such that water (e.g., warm water) may move (e.g., flow) from the power generation unit to the desalination plant. In some aspects, one or more coupling components are positioned within a desalination plant and/or within a power generation unit and/or between a desalination plant and a power generation unit (e.g., at the interface of a desalination plant and a power generation unit). In some versions, power generation unit cooling systems and/or water cooling subsystems may be attached to a temperature control subsystem of a data center such that water may move (e.g., flow) from a power generation unit to a data center and/or from a data center to a power generation unit.

Various embodiments of power generation units provide electrical power to one or more other facilities, e.g., desalination plants) and/or desalination plants (e.g., desalination plants co-located with power generation units and/or data centers) and/or data centers (e.g. data centers co-located with power generation units. As such, certain versions of the disclosed systems include power generation units that are electrically connected (e.g., connected by at least one conductive material, such as a metal cable) to a data center and/or a water desalination plant. In some instances, power generation units may provide all or a portion of the electrical power required to operate a desalination plant and/or the electrical components therein. Similarly, in certain aspects, power generation units may provide all or a portion of the electrical power required to operate a data center and/or the electrical components therein.

In some embodiments, power generation units or aspects thereof, e.g., one or more reciprocating generators and/or fuel cells, are the primary source of electric power for one or more other facility, such as a desalination plant. By "primary source of electric power" as used herein, is meant an outputter of electric power which provides more electric power to a consuming entity, e.g., a consuming entity operably coupled to the source of electric power, such as a water desalination plant, than any other source. In some versions, power generation units produce the majority, e.g., 50% or greater, of power consumed by one or more consuming entity, such as an operating facility, such as a desalination plant and/or a data center. In some versions, power generation units produce all of the electrical power for one or more other facility, such as a desalination plant and/or a data center. As such, in some versions, power generation units and/or one or more other facility operably coupled to the power generation unit or units are not connected to an electrical grid. In certain instances power generation units produce 60% or more, 70% or more, 80% or more, 90% or more, or 99% or more of electrical power consumed and/or required for operation by one or more other facility, such as one or more facility operably coupled and/or co-located with the power generation unit or units.

Certain embodiments of the disclosed systems that include a power generation unit, or aspects thereof, such as reciprocating generators and/or fuel cells, co-located with another facility, such as a data center and/or a desalination plant are configured to produce fewer carbon emissions as compared to the same power generation unit or aspect thereof, data center and/or water desalination plant operating independently (e.g., a power generation unit, data center and water desalination plant not connected in a manner such that water and/or electricity may travel from one to the other). Also, some variations of the disclosed systems that include a power generation unit or aspects thereof, such as reciprocating generators and/or fuel cells, co-located with a data center and/or a desalination plant are configured to use less energy (e.g., electrical energy) as compared to the same power generation unit or aspect thereof, data center and/or water desalination plant operating independently (e.g., a power generation unit, data center and water desalination plant not connected in a manner such that water and/or electricity may travel from one to the other). As such, certain versions of the disclosed systems that include a power generation unit co-located with a data center and/or a desalination plant are configured to be more energy-efficient than the same power generation unit, data center and water desalination plant operating independently.

In some embodiments, a power generation unit is or includes one or more reciprocating generators. By "reciprocating generator", as used herein is meant an electric power generator including one or more reciprocating elements. In some embodiments, reciprocating generators include one or more engine, e.g., a reciprocating engine, such as an internal combustion engine. In some instances, the one or more reciprocating elements are configured to oscillate and/or are one or more pistons. In certain versions, reciprocating generators include one or more electricity generating aspects. By "electricity generating aspect" is meant an aspect configured for producing and/or outputting electricity, such as an electric generator. Such an aspect may be operably coupled, e.g., mechanically coupled, to an engine, e.g., a reciprocating engine. In some embodiments, one or more reciprocating generators have an efficiency, e.g., a simple cycle efficiency, of 43% or more, 45% or more, or 48% or more, and/or in some cases have an efficiency, e.g., a simple cycle efficiency, of 42-70%, such as 45 to 55%, and/or 46%-49%.

In some embodiments, power generation units include one or more, e.g., a plurality, such as 2 or less, 3 or less, 4 or less, 5 or less, 10 or less, 50 or less, or 100 or less, reciprocating generators. In some variations, reciprocating generators of a power generation unit are operably coupled to one or more other reciprocating generators of the power generation unit and/or one or more fuel cells of a power generation unit. Additionally, a reciprocating generator, in some aspects, may include one or more housing, such as a housing containing, e.g., fully containing, one or more reciprocating engine and/or one or more electricity generating aspect.

In various aspects, engines, e.g., reciprocating engines of the subject disclosure, are configured to utilize the expansion of one or more hot gasses to actuate, e.g., oscillate, one or more portion of the engine, e.g., a piston, within one or more second portion of the engine, e.g., a cylinder. In some embodiments, reciprocating engines are configured to convert the linear or substantially linear movement, e.g., reciprocating movement, of one or more pistons to a rotational movement of a shaft, such as a crankshaft to, for example, generate power. In some embodiments, reciprocating engines include a linkage, e.g., a linkage between one or more pistons and one or more crankshafts, configured to convert a reciprocating motion of, for example, one or more pistons, to a rotary motion, for example, of a crankshaft. Reciprocating engines of the subject disclosure include two-stroke engines and four-stroke engines. In some embodiments, the engines are supercharged and as such, may include a supercharger, such as a turbocharger. In some aspects, turbochargers include one or more turbine in an exhaust gas path of an engine, and the turbine may be configured to extract energy for driving a compressor, such as a centrifugal compressor, which is in turn configured to input air into the engine.

In some embodiments, reciprocating engines are internal combustion engines, such as a spark-ignited or compression-ignited engine, such as a diesel engine. In some embodiments, reciprocating engines employ fuel, e.g., a liquid and/or solid and/or gas fuel, to operate, such as one or more fossil fuels, e.g., oil, coal and/or natural gas. In some embodiments, reciprocating engines employ a mixture including one or more fossil fuels, such as gasoline and/or diesel to operate. Reciprocating engines may also employ fuel in the form of heavy and/or light fuel oil, biodiesel, biofuels, and crude oil, or any combination thereof. In various instances, a fuel and/or air-fuel mixture is ignited within a reciprocating engine, such as within a cylinder of a reciprocating engine, to thereby actuate a piston within a cylinder. In some aspects, reciprocating engines generate a spark to ignite one or more fuels within one or more cylinder of the engine. In some instances, reciprocating engines are configured to compress fuel in one or more cylinder until the fuel reaches its auto-ignition temperature and combusts.

In some embodiments, reciprocating engines are powered by steam compressed air and/or other hot gasses and are not internal combustion engines. In some embodiments, reciprocating engines include one or more steam turbines and/or gas turbines.

Examples of engines, such as reciprocating engines, or components thereof, that may be utilized either wholly or partially in connection with the disclosed systems, devices, and methods are provided by U.S. Pat. Nos. 7,061,132; 8,446,112; 8,188,690; 3,861,146; 6,541,875; 7,245,032; 7,681,549; 7,931,003; 7,640,910; 7,182,046; 8,113,165; 3,180,078; 2,670,593; 5,094,203; 8,334,604; 7,400,069; 8,151,744; 7,958,732; 5,696,413; 3,206,609; 6,194,794; 6,532,916; 3,918,263; 8,610,320; 5,497,735; 6,463,890; 5,317,999; 8,141,360; 8,127,544; 6,825,575; 6,298,653; 6,786,045; U.S. Patent Application No. 20080216510; U.S. Patent Application No. 20070040382; U.S. Patent Application No. 20100176594; U.S. Patent Application No. 20140097708; and U.S. Patent Application No. 20120039733, the disclosures of each which are incorporated by reference herein.

As noted above, in some aspects, engines of reciprocating generators, e.g., reciprocating engines, are operably coupled to one or more electricity generating aspects. For example, a rotating portion of a reciprocating engine, such as a crankshaft, may be coupled, e.g., mechanically coupled, to a rotating portion of an electricity generating aspect, such as a second crankshaft and/or a rotor, and may thereby be configured to rotate the second crankshaft and/or rotor. In some instances, a crankshaft of a reciprocating engine extends into an electricity generating aspect and is configured to rotate therein.

In various embodiments, electricity generating aspects can be one or more electric generators which generate electricity by converting mechanical energy, such as mechanical energy produced by an engine, to electrical energy. In some embodiments, electricity generating aspects generate electricity by rotating a first portion, e.g., a portion including one or more magnets and/or one or more coils, such as conducting coils, around a second portion, e.g., a portion including one or more magnets and/or one or more coils, such as conducting coils. In some versions of such embodiments, the second portion can also be rotated with respect to the first portion.

In some embodiments, electricity generating aspects are electromagnetic generators and in some embodiments, electricity generating aspects are electrostatic generators. In various embodiments, electricity generating aspects are alternating current (AC) generators and in various embodiments, electricity generating aspects are direct current (DC) generators. In some embodiments, electricity generating aspects include an electrical outlet, e.g., an electrical outlet including one or more electrical contacts, and are configured to output electricity via the electrical outlet. Various aspects of electricity generating aspects force electric current to flow through a circuit.

Examples of electricity generating aspects that may be utilized either wholly or partially in connection with the disclosed systems, devices, and methods are provided by U.S. Pat. Nos. 7,061,132; 8,610,320; 5,317,999; 3,465,161; 6,931,850; 7,417,331; 3,337,760; 7,309,928; 3,465,161; 6,145,295; 6,868,677; 4,613,304; 4,314,441; 8,640,437; U.S. Pat. No. 20110042967; U.S. Pat. Nos. 5,341,644; 5,696,413; 7,640,910; 6,298,653; 3,206,609; 6,194,794; 2,670,593; 3,918,263; 5,094,203; 6,786,045; 6,825,575; 5,696,413; 7,245,032; 8,334,604; 7,400,069; 7,182,046; 8,113,165; U.S. Patent Application No. 20130001957; U.S. Patent Application No. 20130041514; U.S. Patent Application No. US 20080216510; U.S. Patent Application No. US 20070040382; U.S. Patent Application No. US 20100176594; U.S. Patent Application No. 20050052090; and U.S. Patent Application No. 20120223531, the disclosures of each which are incorporated by reference herein.

In some embodiments, a power generation unit is or includes one or more fuel cells. By "fuel cell" and "fuel cells" is meant a device that converts chemical energy, such as chemical energy from a fuel, into electricity through a chemical reaction, such as a chemical reaction with oxygen or another oxidizing agent. In some embodiments, a plurality, e.g., 2 or more, 10 or more, 50 or more, or 1000 or more of fuel cells are operably connected, e.g., connected in series, to one another to form a power generation unit.

Fuels for fuel cells may include, but are not limited to, hydrogen, hydrocarbons, e.g., natural gas, alcohols, e.g., methanol, or any combination thereof. Fuel cells may include one or more anode, electrolyte and/or cathode. In some embodiments of fuel cells, the cells are configured such that positively charged hydrogen ions travel from the anode to the cathode. In some versions, fuel cells produce water and/or carbon dioxide. In some embodiments, fuel cells produce a voltage, e.g., a voltage at full rated load, ranging from 0.1 V to 0.15V, such as 0.5 V to 0.1 V, or 0.6 V to 0.7 V. In some versions, fuel cells have a power output ranging from 100 W to 2 MW, such as from 10,000 W to 1.5 MW, or 100,000 W to 1 MW. In some embodiments, fuel cells have an efficiency of 50% or more, such as 60% or more, or 70% or more.

In some versions, fuel cells are proton exchange membrane fuel cells (PEMFCs) and may include a proton-conducting polymer membrane, configured to separate anode and cathode sides of the fuel cell. In some embodiments, fuel cells are phosphoric acid fuel cells (PAFCs). In some versions, fuel cells are alkaline fuel cells (AFCs). In some versions, fuel cells are high-temperature fuel cells, such as solid oxide fuel cells (SOFCs) and/or molten carbonate fuel cells (MCFCs). In some versions, power generation units include a plurality of the types of fuel cells disclosed herein.

In some embodiments, fuel cells are shaped as a flat plane and may be positioned in a sandwiched configuration whereas in some versions, fuel cells are shaped as tubes, such as rolled tubes. In versions of fuel cells shaped as tubes, the tubes may be configured such that air and/or fuel may be passed through the inside of a tube and another gas is passed along the outside of the tube for operation. Additionally, in some embodiments, fuel cells may have three or more, four or more, five or more, or six or more layers. Layers of fuel cells may be, for example, an electrolyte, an anode, and a cathode and may have an interconnection, e.g., an interconnection including a metallic or ceramic layer positioned between each individual cell, connecting the other layers.

In aspects of fuel cells which are SOFCs, the fuel cells employ one or more electrolyte, such as a solid oxide and/or ceramic electrolyte, e.g., yttria-stabilized zirconia. In some aspects of SOFCs, the fuel cells may be configured to employ natural gas as a fuel and/or another fuel containing hydrogen atoms. SOFCs may also be configured to operate at temperature ranging from 500° C. to 1500° C., such as 600° C. to 1200° C., or 800° C. to 1000° C. In some embodiments of fuel cells, e.g., SOFCs, the cells are configured such that negatively charged oxygen ions travel from the cathode to the anode. In some embodiments, the chemical reactions occurring in SOFCs are as follows: Anode Reaction: $2H_2+2O^{2-} \rightarrow 2H_2O+4e^-$; Cathode Reaction: $O_2+4e^- \rightarrow 2O^{2-}$; Overall Cell Reaction: $2H_2+O_2 \rightarrow 2H_2O$. Embodiments of SOFC's in accordance with the subject disclosure may include or be a Bloom Energy Server®.

In some embodiments, fuel cells may further include a hydrogen producing region. In such embodiments, a fluid stream is delivered to the hydrogen producing region in the form of one or more hydrogen-producing fluids, or feed streams. The feed stream, or streams, are delivered to the hydrogen-producing region, which may include a suitable catalyst for catalyzing the formation of hydrogen gas from the feed stream(s) delivered thereto. Illustrative, non-exclusive examples of feed stream(s) include water and/or a carbon-containing feedstock, which (when present) may be delivered in the same or separate fluid streams. In the hydrogen-producing region, the feed stream(s) chemically react to produce hydrogen gas therefrom in the form of a mixed gas stream.

Illustrative, non-exclusive examples of suitable mechanisms for producing mixed gas stream from one or more feed stream(s) include steam reforming and autothermal reforming, in which reforming catalysts are used to produce hydrogen gas from at least one feed stream containing water and a carbon-containing feedstock. In a steam reforming process, the hydrogen-producing region may be referred to as a reforming region, and output, or mixed gas, stream may be referred to as a reformate stream. The other gases that are typically present in the reformate stream include carbon monoxide, carbon dioxide, methane, steam, and/or unreacted carbon-containing feedstock. In an autothermal reforming reaction, a suitable autothermal reforming catalyst is used to produce hydrogen gas from water and a carbon-containing feedstock in the presence of air. When autothermal reforming is used, the fuel processor further includes an air delivery assembly that is adapted to deliver an air stream to the hydrogen-producing region. Autothermal hydrogen-producing reactions utilize a primary endothermic reaction that is utilized in conjunction with an exothermic partial oxidation reaction, which generates heat within the hydrogen-producing region upon initiation of the initial oxidation reaction.

Steam reformers typically operate at temperatures in the range of 200° C. and 900° C., and at pressures in the range of 50 psi and 1000 psi, although temperatures outside of this range are within the scope of the present disclosure, such as depending upon the particular type and configuration of fuel processor being used. Any suitable heating mechanism or device may be used to provide this heat, such as a heater, burner, combustion catalyst, or the like. The heating assembly may be external to the fuel cell or may form a combustion chamber that forms part of the fuel processor. The fuel for the heating assembly may be provided by the fuel-processing or fuel cell system, by an external source, or both.

Examples of fuel cells and components thereof that may be utilized either wholly or partially in connection with the disclosed systems, devices, and methods are provided by U.S. Pat. Nos. 6,841,279; 8,568,938; 7,264,895; 7,972,420; 7,250,231; 6,846,584; 5,368,951; 8,632,928; 6,048,383; 7,678,181; 4,031,865; 6,964,820; 7,396,603; 6,110,615; 7,241,521; 7,550,217; 8,465,796; 8,347,645; 8,632,928; 7,547,484; 8,697,301; 8,658,327; 6,589,680; 6,858,337; 3,061,658; 5,733,421; 7,229,711; 6,787,259; 6,655,325; 4,943,493; 7,255,946; U.S. Patent Application No. 20130293015; U.S. Patent Application No. 20130236809; U.S. Patent Application No. 20120268071; U.S. Patent Application No. 20050112437; U.S. Patent Application No. 20110156480; U.S. Patent Application No. 20030077493; U.S. Patent Application No. 20110189570; U.S. Patent Application No. 20130266884; U.S. Patent Application No. 20120169127; U.S. Patent Application No. 20120019071; U.S. Patent Application No. 20120251899; and U.S. Patent Application No. 20110311895, the disclosures of each which are incorporated by reference herein.

Power generation units, in some embodiments, generate or obtain power from renewable energy sources. Renewable energy sources include, for example, one or more systems or devices configured to convert one or more forms of energy (e.g., solar, wind, wave, biofuel, biomass, tidal and/or geothermal energy) to another form (e.g., electric power). For example, a power generation unit may include one or more solar panels.

Water Desalination Plant

In some embodiments, the subject systems include one or more desalination plants. As used herein, the term "desalination plant" refers to a facility configured and/or used for desalinating water. In some embodiments, desalination plants house components for desalinating water.

In some instances, desalination plants operate by distillation (e.g., vacuum distillation). Desalination plants may be configured to boil water (e.g., salt water) and collect water (e.g., water vapor) having a significantly reduced or eliminated salt concentration. Desalination plants, in certain aspects, boil water at less than atmospheric pressure. In some versions, desalination plants operate by multistage flash distillation. As such, desalination plants may be configured to operate by one or more processes that distill water (e.g., seawater) by flashing an amount of water into steam in multiple stages of concurrent heat exchangers. In particular instances, desalination plants using distillation (e.g., vacuum distillation) employ heated water (e.g., warm water) in one or more processes. Certain variations of desalination plants are configured to desalinate water by using both distillation and reverse osmosis processes.

In various embodiments, desalination plants of the disclosed systems are reverse osmosis desalination plants. In some aspects, reverse osmosis desalination plants use pressure and/or one or more semipermeable membranes to desalinate water. In certain versions of reverse osmosis desalination plants, water is passed through one or more semipermeable membranes in order to remove salt and/or minerals and/or other impurities therefrom. In some instances, the efficiency of a desalination process of a reverse osmosis desalination plant is higher if the temperature of the water input (e.g., saltwater) into the desalination process is higher. In various embodiments, a desalination process of a reverse osmosis desalination plant uses less energy per volume of water desalinated if the temperature of the water input (e.g., saltwater) into the desalination process is higher.

By desalinating water, in some aspects, desalination plants may produce desalinated water and/or brine (e.g., both desalinated water and brine). As used herein, the term "brine" refers to a solution discharged from a desalination plant. In certain aspects, brine may be a solution (e.g., a concentrate) including salt (e.g., sodium chloride) and water. In some versions, brine has a salt concentration in the range 3.5% to 26%, such as from 5% to 25% or 10% to 20%. In certain embodiments, brine includes one or more of the impurities removed from water during desalination (e.g., minerals or other components). In some instances, brine may include residues of chemicals used to treat (e.g., clean) a desalination plant.

Embodiments of desalination plants include at least one filter configured for purifying water. In some aspects, the at least one filter of the water intakes includes one or more semipermeable membranes.

In some instances, desalination plants are configured such that an amount of water may move through the plants. In certain embodiments, desalination plants are configured such that an amount of water may move through the plants by traveling through an interconnected desalination structure of operably connected pipes and/or containers. The interconnected desalination structure of operably connected pipes and/or containers, in certain variations, is composed of the same and/or different materials or types of materials as the water cooling subsystems and/or water intakes described above. In some versions, an interconnected desalination structure is operably connected to a water cooling subsystem, e.g., a water cooling subsystem of a power generation unit. In particular embodiments, the interconnected desalination structure of operably connected pipes and/or containers of a desalination plant is connected to and/or includes a coupling component for receiving water from a water source, e.g., a water cooling subsystem, and/or a water discharge for discharging water from the desalination plant.

In particular versions, desalination plants include one or more valves for controlling the movement of water through the desalination plant (e.g., through an interconnected desalination structure of operably connected pipes and/or containers within a desalination plant). In some embodiments, the valves are controllable (e.g., configured to be opened and/or closed in reaction to a designated signal or action). In some aspects each valve is individually controllable (e.g., a valve may be opened and or closed while other valves are not). In certain instances, the one or more valves include electrical components and may be configured to receive an electronic signal from a controller operably connected thereto.

In various aspects, a desalination plant is configured such that water can move (e.g., flow) into the plant from a water source (e.g., a water cooling subsystem). In some embodiments, the water source of a water desalination plant is the water cooling subsystem of a power generation unit (e.g., a co-located power generation unit). As such, where desired, water desalination plants may be configured to receive warm water from water cooling subsystems or a portion thereof (e.g., a warm water discharge or output) and/or another source (e.g., a data center). In some embodiments, water desalination plants are configured such that warm water received into a desalination plant is used in one or more water desalination processes therein.

In certain versions, desalination plants include one or more coupling components. Coupling components may be configured for connecting to and receiving water from a water cooling subsystem. In some aspects, one or more coupling components are positioned within a desalination plant and/or within a power generation unit and/or between a desalination plant and a power generation unit (e.g., at the interface of a desalination plant and power generation unit). In certain instances, the one or one or more coupling components are a pipe or a series of pipes for providing fluid communication between the desalination plant and power generation unit. In some embodiments, the one or more coupling components are operably connected (e.g., attached in a water-tight manner) to a warm water discharge or output of a power generation unit. The one or more coupling components may be operably connected to a water intake (e.g., a cool water intake), as described herein. As such, water (e.g., cool water) may be added to the warm water passing out of the water cooling subsystem of a power generation unit before it enters a desalination plant. The one or more coupling components may be operably connected to a water discharge (e.g., a warm water discharge), as described herein. As such, all or a portion of the water channeled to flow through the coupling component may be channeled to flow into a water source and all or a portion of the water channeled to flow through the coupling component may be channeled to flow into the water desalination plant. The one or more coupling components may also be operably connected to one or more other coupling components.

In certain embodiments, coupling components are configured to have an amount of water (e.g., seawater) move (e.g., flow) through them per time period (e.g., minute or hour or day). For example, coupling components may be configured to have the following amounts of water move (e.g., flow) through them: 5,000 L/day or less; 100,000 L/day or less; 1 million L/day or less; 100 million L/day or less; 500 million L/day or less; or 1 billion L/day or less. Coupling components may also be configured to have more than 1 billion L/day of water move (e.g., flow) through them. Coupling components, in particular embodiments, may be configured to have an amount of water move through them wherein the amount is in any of the ranges: 5,000 L/day to 1 billion L/day; 5,000 L/day to 1 million L/day; 5,000 L/day to 100 million L/day; or 80 million L/day to 100 million L/day. In some aspects, the amount of water moving (e.g., flowing) through a coupling component is variable within a time period (e.g., one minute, one hour, one day, one month, one year).

Some embodiments of desalination plants are configured such that brine moves (e.g., flows) out of a desalination plant through a water discharge. In certain instances, desalination plants are operably connected to (e.g., in fluid communication with) water discharges, as described herein.

A desalination plant, in various aspects, is configured such that desalinated (e.g., water having a low salt concentration) moves out of the desalination plant through a water expulsion aspect. The water expulsion aspect may be one or more pipes. The water expulsion aspect may also be configured to transport the desalinated water to a location where the desalinated water may be used and/or stored. The water expulsion aspect may, in certain aspects, also be configured to transport the desalinated water to a location from which the desalinated water can be further transported.

Desalination plants, in certain versions, include a pump. In some embodiments, a pump is a means for causing water to move through desalination plants and/or other components (e.g., data centers; water cooling subsystems; water intakes; and/or water discharges), as described herein. In particular instances, a pump causes water to move unidirectionally or bidirectionally through desalination plants and/or other components, as described herein. In some embodiments, a pump is electrically powered and/or gasoline powered and/or powered by another means. In certain aspects, a pump is operably connected to a power source (e.g., the power source of the data center), as described herein. In some instances, a pump may be operably connected to a power generation unit. In particular embodiments, tides, and/or a pump powered by tides, cause water to move through the desalination plants and/or other components (e.g., power generation units) described herein. In some embodiments, one or more pumps are located within power generation units and/or desalination plants, as described herein. In certain versions, one or more pumps are located outside power generation units and/or desalination plants, as described herein.

Where desired, desalination plants include electrical components. For example, desalination plants may include temperature and/or lighting control systems as well as electrical systems for desalinating water. In certain aspects, desalination plants (e.g., desalination plants operating independently) use an amount of energy (e.g., electrical energy) for each volume of water desalinated.

As such, desalination plants may be operably connected to at least one power source (e.g., one or more power generation unit, as described herein). In certain aspects, desalination plants may be operably connected (e.g., electrically connected) to a data center or one or more of the components thereof.

In certain versions, desalination plants and/or power sources of desalination plants produce carbon emissions. In certain aspects, desalination plants produce an amount of carbon emissions for each function or portion of a function performed by the desalination plant or components thereof. For example, in some embodiments, desalination plants produce a certain amount of carbon emissions per volume of desalinated water produced.

The disclosed systems, in certain instances, include one or more desalination plants co-located with one or more power generation units. As noted above, certain embodiments of the disclosed systems include desalination plants that are configured to receive and desalinate warm water output from a power generation unit (e.g., a co-located power generation unit). Certain variations of the disclosed systems that include desalination plants configured to receive and desalinate warm water output from a power generation unit are thereby configured to produce fewer carbon emissions as compared to the same power generation unit and water desalination plant operating independently (e.g., a power generation unit and water desalination plant not connected in a manner such that water or electricity may travel from one to the other). Also, in some instances, the disclosed systems include desalination plants that are configured to receive and desalinate warm water output from a power generation unit and are thereby configured to use less energy (e.g., electrical energy) as compared to the same power generation unit and water desalination plant operating independently (e.g., a power generation unit and water desalination plant not connected in a manner such that water or electricity may travel from one to the other).

Water Discharge

The subject systems may include a water discharge. In various aspects, the water discharge is configured for discharging brine from the disclosed systems. In some embodiments, water discharges are operably coupled to a desalination plant and/or a power generation unit, or components thereof, e.g., a water cooling subsystem, and/or a data center. Where appropriate, the water discharge includes one or more openings (e.g., holes, gaps and/or slits) in the portions of the system configured for transporting water and/or brine. For example, the water discharge may be one or more pipes having at least one opening (e.g., an open end) positioned within a body of water such that water and/or brine may flow out of the one or more pipes. In some variations, a water discharge or an opening therein is shaped as a circle, rectangle, square, slit, polygon, quadrilateral, oval, semicircle, or other shape. Where desired, a water discharge or an opening therein may have a single defined radius of symmetry. In some aspects, a water discharge or an opening therein may radii of curvature lying within a single plane (e.g., a vertical plane or a horizontal plane).

In certain embodiments, water discharges (e.g., one or more openings in water discharges) are configured to discharge or otherwise have an amount of water (e.g., seawater) move through them in a set time period (e.g., a minute or hour or day). For example, water discharges may be configured to discharge up to: 5,000 L/day; 1 million L/day; 100 million L/day; 500 million L/day; or 1 billion L/day. Water discharges may also be configured to discharge more than 1 billion L/day. Water discharges, in particular embodiments, may be configured to discharge an amount of water in any of the ranges: 5,000 L/day to 1 billion L/day; 5,000 L/day to 100 million L/day; 100,000 L/day to 1 million L/day; or 80 million L/day to 100 million L/day. In some aspects, the amount of water moving (e.g., flowing) through a discharge is variable within a time period (e.g., one minute, one hour, one day, one month, one year).

In some aspects, a water discharge or a portion thereof is positioned outside the desalination plant. In certain versions, the water discharge or a portion thereof is positioned outside the portion of the power generation unit containing the one or more associated components for power generation and/or outside the desalination plant. In some embodiments, the water discharge is operably connected to (e.g., in fluid communication with) at least one portion of the desalination plant and/or at least one portion of the water cooling subsystem located inside the portion of the power generation unit and/or data center wherein cool water is heated (e.g., heated to warm water).

Embodiments of the systems include a water discharge or a portion thereof, such as a terminal end, positioned within a water source, e.g., positioned at a depth of 15 m or more in a water source. Some variations of the systems include a water discharge and/or at least one opening therein (e.g., a terminal opening at the end of the discharge furthest from the desalination plant and/or portion of the power generation unit configured to power and its related components) positioned at a depth of 1 m or more; 2 m or more; 3 m or more; 4 m or more; 5 m or more; 6 m or more; 7 m or more; 8 m or more; 9 m or more; 10 m or more; 11 m or more; 12 m or more; 13 m or more; 14 m or more; 16 m or more; 17 m or more; 18 m or more; 19 m or more; 20 m or more; 25 m or more; 30 m or more; 35 m or more; 40 m or more; 45 m or more; 50 m or more; 60 m or more; 70 m or more; 80 m or more; 90 m or more; 100 m; 200 m or more and/or 300 m or more in a water source. In some aspects, systems include a water discharge and/or at least one opening therein positioned below and/or within a particular zone (e.g., euphotic and/or disphotic, and/or aphotic zone) in a water source, e.g., a cool water source, such as an ocean or sea. Systems, in some embodiments, include a water discharge and/or at least one opening therein positioned below the photic zone in a water source.

In certain variations of the disclosed systems wherein a water discharge is positioned at a particular depth within a water source (e.g., a depth of 15 m or more), its center (e.g., the center-most point of a water discharge) and/or the top edge (e.g., the edge or portion closest to the surface of the water) of the water discharge and/or the bottom edge (e.g., the edge or portion furthest from the surface of the water) of the water discharge is positioned at that particular depth below the surface of the water. In certain aspects, a water discharge positioned at a particular depth within a water source may have an opening wherein the center of the opening (e.g., the center-most point of a circular and/or square opening) and/or the top edge (e.g., the edge or portion closest to the surface of the water) of the opening and/or the bottom edge (e.g., the edge or portion furthest from the surface of the water) of the opening is positioned at that particular depth below the surface of the water.

The water discharges of the disclosed systems may, in various embodiments, be composed of one or more materials or one or more types of materials. Examples of materials that the water discharges of the disclosed systems may be composed of include polymers, ceramics, metals, glasses and/or a combination thereof. In some aspects, the water discharges are not composed of metal or material that is subject to corrosion (e.g., corrosion by rust). Where appropriate, water discharges are composed of plumbing materials. For example, water discharges may be composed of polyvinyl chloride (PVC) pipes and/or joints and one or more adhesives for fastening the pipes in a water-tight manner. In certain aspects, one or more materials of the water discharges may be rigid. In some instances, one or more materials of the water discharges may be flexible (e.g., one or more rubber tubes or hoses). However, these examples of materials are not limiting and the materials of the water discharges may be any material, or combination of materials, having the structural and chemical properties necessary to function in the disclosed systems as described herein.

Data Center

Certain versions of the disclosed systems include one or more data centers. As noted above, the term "data center" refers to a facility configured and/or used for physically housing (e.g., containing within it) one or more computer systems and/or associated components. In certain embodiments, data centers include the components therein and manage, store, process and/or exchange digital information and data. In some instances, data centers are co-located with and/or operably connected to one or more other facilities, such as one or more power generation units and/or desalination plants.

In particular aspects, data centers may include computers, data storage devices, servers (e.g., web servers, database servers and/or application servers), switches, routers, vaults, load balancers, racks, wire cages or closets and/or related equipment. Data centers may include redundant data communications connections, backup or redundant power supplies, security devices, and/or fire suppression systems. In some instances, data centers include data storage systems and/or telecommunications systems.

Some versions of data centers are used for providing application services or management for various types of data processing (e.g., intranet, web hosting internet). In particular embodiments, data centers are used, for example, to operate and manage one or more carriers' telecommunication network, provide data center applications directly to one or more carriers' customers and/or provide hosted applications for one or more third parties to provide services to customers.

Embodiments of data centers include data centers that are within one or more buildings. In certain aspects, data centers occupy one or more rooms of a building, one or more floors of a building or an entire building.

In some instances, data centers are electrically powered. For example, certain embodiments of data centers consume electricity to operate. Power draw for data centers may range from a few kW (e.g., one, two, three, four or five kW) to several tens of MW (e.g., one, two, three, four, five, six, seven, eight or nine tens of MW) for larger facilities. In certain aspects of data centers, the data centers have power densities of more than one-hundred times that of an average office building. In some embodiments of data centers, electricity costs are the primary operating expense of the data center and may account for 10% or more of a data center's total cost of ownership. Embodiments of data centers are operably connected to at least one power source, e.g., one or more power generation units, as described herein.

In certain embodiments, data centers use an amount of energy for each function performed by the data center or components thereof. For example, data centers or systems including data centers may use a specific amount of energy per amount of data center cooling. In some aspects, data centers or systems including data centers have a degree of energy efficiency that may be quantified as the power usage effectiveness (PUE) of the data center or system including a data center (e.g., a PUE of 1.0; 1.1; 1.2; 1.3; 1.4; 1.5; 1.6; 1.7; 1.8; 1.9; or 2.0). The PUE is the ratio of the total power entering a system (e.g., a data center and optionally, a desalination plant and/or a data center power source, such as a power generation unit) to the power used by the computer systems and/or associated components (e.g., information technology equipment) within the system (e.g., the data center). In various aspects, a PUE is the inverse of the data center infrastructure efficiency (DCiE). In some versions, systems (e.g., data centers) have a PUE of 2.0 or less, or less than 2, such as 1.9 or less, e.g., 1.8, 1.7, 1.6, 1.5, 1.4, 1.3, 1.2 or 1.1 or less (e.g., a PUE ranging from 1.0 to 2.0). In some embodiments, a system (e.g., a data center) has a PUE ranging from 1.0 to 1.3. In some instances, a system, (e.g., a data center) has a PUE of or about 1.0, where a PUE of or about 1.0 is a PUE near, and greater than, 1.0 (e.g., 1.01 or 1.02 or 1.03 or 1.04 or 1.05 or 1.06 or 1.07 or 1.08 or 1.09 or 1.1 or 1.15 or 1.2 or 1.25 or 1.3 and/or within the range 1.01 to 1.30). In determining the PUE of data centers of the invention, one may factor in a component that represents the reduced energy used by the desalination plant in desalinating the warm water output of the data center cooling subsystem. Any convenient protocol for factoring in this component into the PUE determination may be employed. For example, the reduction in energy used by the desalination plant resulting from co-location of the desalination plant with the data center (and particularly by using the warm output water from the data center) may be added to the amount of energy input into the data center which is used by the computer systems and/or associated components (e.g., information technology equipment). One particular formula that may be employed is:

$$PUE = \text{Total Facility Power/IT Equipment Power}$$

In the above formula for PUE, total facility power includes cooling and lighting, as well as anything that is not considered a computing device, whereas IT equipment is computing devices A PUE of 1.0 is ideal meaning that all the power is going to computing devices. A PUE of less than 2.0 is desirable, but more ideally less than 1.5, and more optimally less than 1.1, and optimally below 1.01. By performing the cooling with cool sea water, then only the cost of pumping the water adds to total facility power.

In some embodiments, data centers and/or power sources of data centers, such as power generation units, produce carbon emissions. In certain aspects, data centers (e.g., data centers operating independently) produce an amount of carbon emissions for each function or portion of a function performed by the data center or components thereof.

Data centers, in certain instances, produce heat. As such, certain versions of data centers include environmental control systems (e.g., one or more air conditioning units) for controlling at least a portion of the environment with a data center. In some aspects, environmental control systems include temperature control subsystems. In some instances, temperature control subsystems are configured to heat and/or cool at least a portion of the data centers.

In some instances, environmental control systems include humidity control systems that are configured to control the amount of humidity in at least a portion of the data centers. In some aspects, environmental control systems include pressure control systems that are configured to control the pressure level in at least a portion of the data centers. Some versions of environmental control systems are configured to maintain at least a portion of a data center and/or computer related equipment therein at a temperature between 16° C. and 24° C. (e.g., 17° C.; 18° C.; 19° C.; 20° C.; 21° C.; 22° C. or 23° C.) and/or within a humidity range of 40%-55% and/or with a maximum dew point of 15° C.

In various instances, and as noted above, data centers include one or more temperature control subsystems. The phrases "temperature control subsystem" and "temperature control subsystems", as used herein, refer to an interconnected structure located at least partially within a data center that is configured to cool at least one component (e.g., a server) or portion (e.g., a room) of the data center. Temperature control subsystems, in various embodiments, include each, or any combination of the characteristics of the water cooling subsystems described herein.

For example, in some embodiments, temperature control subsystems are configured to receive cool water and output warm water. Where desired, the interconnected structure of a temperature control subsystem includes one or more components (e.g., pipes and/or containers) configured to carry water from one location (e.g., the location of the intake) to another location. In certain embodiments, temperature control subsystems include a warm water emitter. In some embodiments, temperature control subsystems are water-tight except for an intake for receiving water into the subsystems and warm water emitter for discharging water out of the subsystems. The temperature control subsystems, in certain instances, may be configured to receive water (e.g., cool water) from a cool water source, such as an ocean and/or sea and/or river and/or lake and/or groundwater source and/or other water source. In some instances, temperature control systems include a water intake, such as any of the intakes described herein. In various embodiments, temperature control systems are operably connected to a water discharge, such as any of the water discharges described herein.

In some aspects, the temperature control subsystem may be configured to carry cool water to at least one location in a data center (e.g., a location where heat is produced by the data center) where the cool water is heated and thereby converted to warm water. Cool water may be heated and converted to warm water within a heat exchange element of a temperature control subsystem, which is described in further detail below. The temperature control subsystem may also, in some instances, be configured to carry warm water away from one location in a data center (e.g., the location of a heat exchange element) to another location (e.g., a location outside a portion of the data center which contains one or more computer systems and/or associated components). Where desired, the temperature control subsystem is configured to carry heat energy away from one or more computer systems and/or associated components that generate heat energy by allowing generated heat energy to be transferred to water (e.g. cool water) within the temperature control subsystem (e.g., within a heat exchange element of the temperature control subsystem) and thereafter, transferring the heated water (e.g., warm water) away from the position within the data center where it was heated. By transferring water within a data center and thereby cooling one or more computer systems and/or associated components within the data center, the temperature control subsystem optimizes the operation of the systems and/or components by providing an environment in which the systems and/or components may effectively operate.

In certain instances, temperature control subsystems include a heat exchange element. In particular embodiments, heat exchange elements are configured to cool one or more locations and/or components within a data center. For example, heat exchange elements may be configured to allow an exchange of heat produced by a data center at a first location to a medium (e.g., air and/or water) and thereafter transfer the heated medium to a second location so that the first location of the data center and/or components at the first location are cooled. In some aspects, heat exchange elements are configured such that a medium (e.g., cool water) may be channeled into the heat exchange element (e.g., from a first portion of the temperature control subsystem) and/or a medium (e.g., warm water) may be channeled out of the heat exchange element (e.g., to a second portion of the temperature control subsystem).

In certain aspects, a heat exchange element is an air conditioning system (e.g., one or more air conditioning units). In some instances, heat exchange elements are configured to cool air around (e.g., in the same room of a data center as data center components) components (e.g., electrical components) of the data center which produce heat. In some instances, heat exchange elements are configured to allow the transfer of heat from air (e.g., air heated by data center components) around (e.g., in the same room of a data center as data center components) components (e.g., electrical components) of the data center which produce heat to cool water. Such an exchange will result in the air being cooled and the water being warmed (e.g., to warm water). Accordingly, in some aspects, cool water is heated to warm water within the heat exchange element. In certain instances, heat exchange elements are configured to remove air that has been heated by components of a data center from the area of the data center (e.g., room) in which the components are located.

In certain embodiments, heat exchange elements are one or more channels (e.g., channels having a large interior and/or exterior surface area) physically integrated with components of a data center (e.g., electronic components which produce heat). Where desired, heat exchange elements are configured such that water may flow through them and thereby transfer heat away from the data center components. In some versions, the heat exchange element is operably connected to the remainder of the temperature control subsystem at one or more locations (e.g., one, two, three, four or five locations). In certain aspects, the heat exchange element is composed of the same materials as the remainder of the temperature control subsystem or different materials. Examples of heat exchange elements or components thereof that may be utilized either wholly or partially in connection with the disclosed systems are provided by the patents and applications of which the disclosures are incorporated by reference above.

Methods

As summarized above, aspects of the present disclosure include methods for cooling a power generation unit and desalinating salt water. In certain embodiments, the methods have steps (e.g., sequential steps and/or simultaneous steps)

including (1) cooling a power generation unit, or aspects thereof, such as one or more reciprocating generators and/or one or more fuel cells, e.g., one or more solid oxide fuel cell, with a water cooling subsystem by, for example, receiving cool water into the water cooling subsystem and outputting warm water from the water cooling subsystem; and (2) desalinating warm water output from the water cooling subsystem using a desalination plant that is co-located with the power generation unit, or aspects thereof, such as one or more reciprocating generators and/or one or more fuel cells. In some aspects of the methods, the methods include employing a power generation unit, or aspect thereof, such as one or more reciprocating generators and/or one or more fuel cells as the primary source of electric power for a desalination plant.

The word "cooling" is used broadly and generically to refer to lowering the temperature of an aspect, e.g., a power generation unit or a portion of one or more components therein, or a portion of an aspect, e.g., a portion of a power generation unit that is heated by one or more components of the power generation unit. As such, in some embodiments, cooling a power generation unit with a water cooling subsystem includes lowering the temperature of at least a portion of the power generation unit or one or more components of the power generation unit using the water cooling subsystem.

As noted above, in some embodiments, water cooling subsystems include a water intake. In some embodiments, cooling a power generation unit with a water cooling subsystem includes moving, e.g., intermittently or continually pumping, water, e.g., cool water, through at least a portion of the water cooling subsystem, e.g., the intake, and/or absorbing heat produced by the power generation unit using the water cooling subsystem and/or water pumped through the subsystem. As such, in some versions, the methods include employing the water cooling subsystem to absorb heat produced by the power generation unit. In certain instances, cooling a power generation unit with a water cooling subsystem includes moving, e.g., pumping, water, e.g., warm water, through at least a portion of the water cooling subsystem after the water cooling subsystem and/or water therein has absorbed heat produced by the power generation unit. In various embodiments, cooling a power generation unit with a water cooling subsystem includes moving, e.g., pumping, water, e.g., warm water, out of the water cooling subsystem, e.g., pumping water through a warm water emitter of a water cooling subsystem. In some variations, cooling a power generation unit with a water cooling subsystem includes moving, e.g., pumping, water, e.g., warm water, into a desalination plant and/or a data center.

The word "desalinating" is used broadly and generically to refer to conducting one or more processes (e.g., reverse osmosis) to desalinate water. As such, in some embodiments, desalinating water includes receiving water (e.g., warm water) from a warm water emitter of a power generation unit into a desalination plant (e.g., a desalination plant co-located with the power generation unit) and conducting one or more desalination processes to desalinate the water. In some embodiments of the disclosed methods, cooling a power generation unit and desalinating salt water includes co-locating and/or operably connecting a power generation unit and a desalination plant.

In particular aspects of the methods, desalinating water includes receiving water (e.g., warm water) from a warm water emitter of a power generation unit into a desalination plant (e.g., a desalination plant co-located with the power generation unit) and conducting one or more desalination processes to desalinate the water. In some instances, desalinating water includes moving (e.g., intermittently or continually pumping) water (e.g., warm water) through one or more components of a desalination plant and thereby desalinating the water.

In certain versions of the disclosed methods, cooling a power generation unit and desalinating water, e.g., salt water, includes obtaining (e.g., intermittently or constantly pumping) water (e.g., seawater) into, through, and/or from a water intake. Particular variations of the disclosed methods include positioning a water intake, or at least one opening therein, such a terminal opening, at a particular depth within a water source (e.g., below the photic zone of a water source). In some aspects of the disclosed methods, a water source is an ocean or sea.

In certain aspects of the disclosed methods, cooling a power generation unit and desalinating salt water includes discharging (e.g., intermittently or constantly pumping) brine from a desalination plant into a body of water (e.g., an ocean or sea). Discharging brine from a desalination plant may be via a water discharge. Particular versions of the disclosed methods include discharging brine at a particular depth within a body of water (e.g., within or below the photic zone of an ocean or sea).

Embodiments of the disclosed methods include positioning a water intake or at least one opening therein and/or discharging brine, e.g., discharging brine via a water discharge, at a depth of 15 m or more in a water source. Some variations of the methods include positioning a cool water intake or at least one opening therein and/or discharging brine at a depth of 1 m or more; 2 m or more; 3 m or more; 4 m or more; 5 m or more; 6 m or more; 7 m or more; 8 m or more; 9 m or more; 10 m or more; 11 m or more; 12 m or more; 13 m or more; 14 m or more; 16 m or more; 17 m or more; 18 m or more; 19 m or more; 20 m or more; 25 m or more; 30 m or more; 35 m or more; 40 m or more; 45 m or more; 50 m or more; 60 m or more; 70 m or more; 80 m or more; 90 m or more; 100 m or more; 200 m or more; and/or 300 m or more in a body of water (e.g., an ocean or sea). In certain instances, the disclosed methods include positioning a water intake or at least one opening therein, e.g., a terminal opening, and/or discharging brine below and/or within a particular zone (e.g., euphotic and/or disphotic, and/or aphotic and/or benthic zone) in a body of water (e.g., an ocean or sea).

In certain variations of the methods, positioning a water intake, or at least one opening therein, and/or discharging brine, at a particular depth within a water source (e.g., a depth of 15 m or more), includes positioning the center of the intake (e.g., the center-most point of a water intake) and/or the center of a water discharge (e.g., the center-most point of a water discharge) and/or the top edge (e.g., the edge or portion closest to the surface of the water) of the water intake and/or water discharge and/or the bottom edge (e.g., the edge or portion furthest from the surface of the water) of the water intake and/or water discharge at that particular depth below the surface of the water. Where desired, a water intake and/or water discharge positioned at a particular depth within a water source may have an opening wherein the center of the opening (e.g., the center-most point of a circular and/or square opening) and/or the top edge (e.g., the edge or portion closest to the surface of the water) of the opening and/or the bottom edge (e.g., the edge or portion closest to the surface of the water) of the opening is positioned at that particular depth below the surface of the water.

The desalination plant, in some aspects of the methods, is a reverse osmosis desalination plant. As such, in certain instances, water is desalinated using one or more reverse osmosis processes. In some embodiments, water (e.g., warm water) is desalinated by passing the water through one or more semipermeable membranes in order to remove salt and/or minerals and/or other impurities therefrom.

In some versions of the disclosed methods, one or more power generation units, or an aspect thereof, such as one or more reciprocating generators and/or fuel cells, e.g., one or more solid oxide fuel cells, employed according to the subject methods are not operably connected to a community electrical grid. In some embodiments, the methods include not transmitting electrical power, or a substantial amount of electrical power, to an electrical power grid e.g., a community electrical grid, from a power generation unit.

In some embodiments of the methods, the methods include cooling a data center, such as a data center co-located with a power generating unit and/or a desalination plant. As such, various embodiments of the disclosed methods include any single or combination of characteristics of the methods described herein in association with cooling a power generation unit applied instead, or in addition to, cooling a data center. Accordingly, features of the methods described herein in association with water cooling subsystems of power generation units also apply to temperature control subsystems of data centers and corresponding characteristics and applications thereof.

In various aspects of the methods, data centers include a temperature control subsystem, such as a temperature control subsystem configured to receive cool water and output warm water. Accordingly, the subject methods include receiving cool water into a temperature control subsystem of a data center and/or outputting warm water form a temperature control subsystem.

As described above, in some embodiments, power generation units, data centers, and/or desalination plants produce carbon emissions. In certain aspects, power generation units, and/or data centers and/or desalination plants (e.g., desalination plants operating independently) produce an amount of carbon emissions for each function or portion of a function performed by the desalination plant or components thereof. For example, in some variations, desalination plants produce a certain amount of carbon emissions per volume of desalinated water produced.

Also, as noted above, co-locating and/or operably connecting a power generation unit, and/or data center and/or desalination plant can reduce their overall carbon emissions. As such, in some instances, the disclosed methods of cooling a power generation unit, e.g., a reciprocating generator, and/or data center and desalinating salt water at a desalination plant co-located with the power generation unit and/or data center produce fewer carbon emissions as compared to operating the same power generation unit and/or data center and water desalination plant independently (e.g., a power generation unit and water desalination plant not connected in a manner such that water or electricity may travel from one to the other). In certain variations, the disclosed methods of cooling a power generation unit and/or data center and desalinating salt water at a desalination plant co-located with the power generation unit and/or data center include producing a smaller carbon footprint as compared to the same power generation unit and water desalination plant operating independently.

In particular instances, power generation units, data centers and/or desalination plants use an amount of energy for each function performed by the power generation units, data centers and/or desalination plants or components thereof. For example, desalination plants may use a specific amount of energy per amount of water desalinated.

Co-locating and/or operably connecting a power generation unit, data center and/or desalination plant can, in some embodiments, improve their overall energy efficiency. As such, the disclosed methods of cooling a power generation unit and/or data center and desalinating salt water at a desalination plant co-located with the power generation unit, e.g., a reciprocating generator, and/or data center may use less energy per amount of power generation unit and/or data center cooling and per volume of water desalinated as compared to the same power generation unit and/or data center and water desalination plant operating independently (e.g., a data center and water desalination plant not connected in a manner such that water or electricity may travel from one to the other). In certain versions, the disclosed methods of cooling a power generation unit and/or data center and desalinating salt water at a desalination plant co-located with the power generation unit and/or data center include cooling a power generation unit and/or data center and desalinating water in a more energy-efficient manner as compared to operating the same power generation unit and/or data center and water desalination plant independently.

In particular aspects, the disclosed methods of cooling a power generation unit and/or data center and desalinating salt water at a desalination plant co-located with the power generation unit and/or data center include maintaining the PUE (e.g., the PUE of the data center) at a particular value, such as 2.0 or less, e.g., 1.9, or less, 1.8 or less, 1.7 or less, 1.6 or less, 1.5 or less, 1.4 or less, 1.3 or less, 1.2 or less, 1.1 or less, where the particular value at which the data center is maintained may vary, e.g., a PUE of 1.0; 1.1; 1.2; 1.3; 1.4; or 1.5. In certain instances, the disclosed methods of cooling a power generation unit and/or data center and desalinating salt water at a desalination plant co-located with the power generation unit and/or data center include maintaining the PUE (e.g., the PUE of the data center) within a particular range (e.g., 2 or below, below 2; between 0 and 2; or between 1 and 2). For example, in some aspects, the disclosed methods of cooling a power generation unit and/or data center and desalinating salt water at a desalination plant co-located with the data center include maintaining the PUE (e.g., the PUE of the data center) between 1 and 1.3 and/or including 1 and 1.3, or at a value greater than 1 but approaching 1 (e.g., 1.1; 1.15; 1.2; 1.25; or 1.3).

In certain versions, the disclosed methods of cooling a power generation unit and/or data center and desalinating salt water at a desalination plant co-located with the power generation unit and/or data center include co-locating and/or operably connecting a power generation unit and/or data center, desalination plant and power plant. As such, in certain embodiments, the disclosed methods include obtaining power to operate the data center and/or the desalination plant from a power generation unit, e.g., one or more reciprocating generators and/or fuel cells, co-located with the data center and/or the desalination plant.

As noted above, in some instances, data centers, desalination plants and/or power generation units produce carbon emissions. In certain aspects, power generation units produce an amount of carbon emissions for each function or portion of a function performed by the power generation unit or components thereof. For example, power generation units may produce a certain amount of carbon emissions per amount of electrical power generated.

Also, as described above, co-locating and/or operably connecting a data center, desalination plant and/or power generation unit can reduce their overall carbon emissions. As such, in various instances, the disclosed methods of cooling a power generation unit, e.g., a reciprocating generator, and/or data center and desalinating salt water at a desalination plant co-located with the power generation unit and/or data center that include obtaining power to operate the data center and the desalination plant from a power generation unit co-located with the data center and/or the desalination plant produce fewer carbon emissions as compared to operating the same data center, water desalination plant and/or power generation unit operating independently. In some versions, the disclosed methods of cooling a power generation unit and/or data center and desalinating salt water at a desalination plant co-located with the power generation unit and/or data center by obtaining power to operate the data center and the desalination plant from a power generation unit co-located with the data center and/or the desalination plant include producing a smaller carbon footprint as compared to the independent operation of the same power generation unit and/or data center and water desalination plant.

Furthermore, co-locating and/or operably connecting a power generation unit and/or data center and desalination plant can improve their overall energy efficiency. As such, in some instances, the disclosed methods of cooling a power generation unit and/or data center and desalinating salt water at a desalination plant co-located with the power generation unit and/or data center that include obtaining power to operate the data center and the desalination plant from a power generation unit co-located with the data center and the desalination plant use less energy per amount of power generation unit and/or data-center cooling or per volume of water desalinated than the same power generation unit and/or data center and water desalination plant operating independently (e.g., operating while not operably connected). In some versions, the disclosed methods of cooling a power generation unit and/or data center and desalinating salt water at a desalination plant co-located with the power generation unit and/or data center by obtaining power to operate the data center and the desalination plant from a power generation unit which is co-located with the data center and the desalination plant include cooling the power generation unit and/or data center, desalinating water and/or producing or obtaining power in a more energy-efficient manner as compared to operating the same power generation unit and/or data center and water desalination plant independently.

The disclosed methods of cooling a power generation unit and/or data center and desalinating salt water at a desalination plant co-located with the power generation unit and/or data center by obtaining power to operate the data center and the desalination plant from a power generation unit co-located with the data center and the desalination plant, in various embodiments, include maintaining a PUE (e.g., the PUE of the data center) at a particular value (e.g., any PUE value listed herein, or another PUE value) or within a range of particular values (e.g., any range of PUE values listed herein, or another range of PUE values).

Utility

The subject systems and methods may be used to cool power generation units and desalinate water. As described herein, in certain aspects, the disclosed systems may be configured to operate in a way that is more effective than operating components of the systems independently. For example, a power generation unit, or aspect thereof, such as a reciprocating generator and/or fuel cell, co-located with and operably connected to a desalination plant may allow the power generation unit and/or desalination plant to use less energy per amount of electrical power generated and/or per volume of water desalinated as compared to the same power generation unit and water desalination plant operating independently. Similarly, the methods disclosed herein may allow the operation of a power generation unit and/or desalination plant to use less energy per amount of electrical power generated and/or per volume of water desalinated as compared to methods of operating the same power generation unit and water desalination plant independently. Furthermore, the disclosed systems and methods relating to a power generation unit co-located with and operably connected to a desalination plant and/or a data center may allow the data center and/or desalination plant and/or power generation unit to use less energy per amount of data-center cooling and/or per volume of water desalinated and/or per amount of electrical power generated as compared to the same data center, water desalination plant and power generation unit operating independently.

The disclosed systems and methods may also operate in such a way as to minimize the impact of power generation units, desalination plants and/or data centers on the surrounding environment. For example, operation of the disclosed systems or utilization of the disclosed methods may result in a power generation unit and water desalination plant that produce fewer carbon emissions or less thermal pollution as compared to the same power generation unit and water desalination plant operating independently. Also, operation of the disclosed systems or utilization of the disclosed methods may result in a data center, water desalination plant and power generation unit that produce fewer carbon emissions or less thermal pollution as compared to the same data center, water desalination plant and power generation unit operating independently.

Accordingly, the subject systems and methods may be applied to minimize the amount of energy used by power generation units, desalination plants and/or data centers. The subject systems and methods may also be applied to minimize the amount of carbon emissions from power generation units, desalination plants and/or data centers. By enhancing efficiency of operation and minimizing carbon emissions, the disclosed systems and methods are useful to minimize costs associated with power generation units, desalination plants and/or data centers and to promote the quality of the surrounding environments.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims. It is also to be understood that the terminology used herein is for the purpose of describing particular embodiments only, and is not intended to be limiting, since the scope of the present invention will be limited only by the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. A system comprising:
   (a) a reciprocating generator comprising:
      a reciprocating engine that generates on-site electrical power, wherein the reciprocating engine comprises an interconnected structure of pipes, and
      a water cooling subsystem that receives cool water and outputs reciprocating generator water cooling subsystem warm water, wherein the reciprocating generator is not operably connected to a community electrical grid, and wherein the water cooling subsystem comprises a first water intake pipe positioned in a cool water source that is an ocean or sea, wherein the water cooling subsystem receives cool water from the first water intake pipe and cools the reciprocating generator by moving the cool water through the interconnected structure of pipes;
   (b) a data center comprising:
      information technology equipment comprising computers, data storage devices, servers, switches, routers, vaults, load balancers, racks, wire cages, and closets, and
      a data center temperature control subsystem that receives cool water from the first water intake pipe and outputs data center temperature control subsystem warm water, wherein the data center receives power from the reciprocating generator, wherein the data center temperature control subsystem comprises pipes located at least partially within the data center and cools the information technology equipment by moving the received cool water through the pipes located at least partially within the data center; and
   (c) a water desalination plant co-located with and operably connected to the interconnected structure of pipes of the reciprocating generator and the temperature control subsystem of the data center, wherein the water desalination plant is comprised of operably connected pipes and containers and receives power from the reciprocating generator, and further wherein the water desalination plant receives and desalinates the output warm water from both the reciprocating generator water cooling subsystem and the data center temperature control subsystem.

2. The system according to claim 1, wherein the water intake is positioned at a depth of 15 m or more in the cool water source.

3. The system according to claim 1, wherein the water intake pipe is positioned below the photic zone in the cool water source.

4. The system according to claim 1, further comprising a water discharge pipe for discharging brine from the water desalination plant.

5. The system according to claim 4, wherein the water discharge pipe is positioned at a depth of 15 m or more in a body of water.

6. The system according to claim 1, wherein the water desalination plant is a reverse osmosis desalination plant.

7. The system according to claim 1, wherein the data center has a power usage effectiveness less than 2.

8. The system according to claim 7, wherein the data center has a power usage effectiveness ranging from 1 to 1.3.

9. A system comprising:
   (a) a power generation unit comprising:
      a solar panel that generates on-site electrical power and is not operably connected to a community electrical grid, wherein the solar panel comprises an interconnected structure of pipes, and
      a water cooling subsystem that receives cool water and outputs warm water, wherein the water cooling subsystem comprises a first water intake pipe positioned in a cool water source that is an ocean or sea, wherein the water cooling subsystem receives cool water from the first water intake pipe and cools the solar panel by moving the cool water through the interconnected structure of pipes;
   (b) a data center comprising:
      information technology equipment comprising computers, data storage devices, servers, switches, routers, vaults, load balancers, racks, wire cages, and closets, and
      a data center temperature control subsystem that receives cool water from the first water intake pipe, wherein the data center receives power from the solar panel, wherein the data center temperature control subsystem comprises pipes located at least partially within the data center and cools the information technology equipment by moving the received cool water through the pipes located at least partially within the data center; and
   (c) a water desalination plant co-located with and operably connected to the interconnected structure of pipes of the solar panel and the temperature control subsystem of the data center, wherein the water desalination plant is comprised of operably connected pipes and containers and receives power from the solar panel, and further wherein the water desalination plant receives and desalinates the output warm water from both the solar panel water cooling subsystem and the data temperature control subsystem.

10. The system according to claim 1, wherein the reciprocating generator is configured to produce 100 MW or less of electrical power.

11. The system according to claim 1, wherein the desalination plant is a reverse osmosis desalination plant.

12. The system according to claim 9, wherein the water desalination plant is a reverse osmosis desalination plant.

13. The system according to claim 9, wherein the data center has a power usage effectiveness less than 2.

14. A system comprising:
   (a) a power generation unit comprising:
      a fuel cell that generates on-site electrical power and is not operably connected to a community electrical grid, wherein the fuel cell comprises an interconnected structure of pipes, and
      a water cooling subsystem that receives cool water and outputs warm water, wherein the water cooling subsystem comprises a first water intake pipe positioned in a cool water source that is an ocean or sea, wherein the water cooling subsystem receives cool water from the first water intake pipe and cools the fuel cell by moving the cool water through the interconnected structure of pipes;

(b) a data center comprising:
information technology equipment comprising computers, data storage devices, servers, switches, routers, vaults, load balancers, racks, wire cages, and closets, and
a data center temperature control subsystem that receives cool water from the first water intake pipe, wherein the data center receives power from the fuel cell, wherein the data center temperature control subsystem comprises pipes located at least partially within the data center and cools the information technology equipment by moving the received cool water through the pipes located at least partially within the data center; and (c) a water desalination plant co-located with and operably connected to the interconnected structure of pipes of the fuel cell and the temperature control subsystem of the data center, wherein the water desalination plant is comprised of operably connected pipes and containers and receives power from the fuel cell, and further wherein the water desalination plant receives and desalinates the output warm water from both the fuel cell water cooling subsystem and the data center temperature control subsystem.

15. The system according to claim 14, wherein the water desalination plant is a reverse osmosis desalination plant.

16. The system according to claim 14, wherein the data center has a power usage effectiveness less than 2.

17. The system according to claim 11, wherein the fuel cell is a solid oxide fuel cell.

18. The system according to claim 1, wherein the reciprocating engine is an internal combustion engine.

19. The system according to claim 14, further comprising a steam reformer operably coupled to the fuel cell, wherein the steam reformer comprises a reforming catalyst configured to produce a hydrogen gas-containing reformate stream from a carbon-containing feed stream.

20. The system according to claim 19, wherein warm water outputted by the water cooling subsystem provides heat to the steam reformer.

* * * * *

UNITED STATES PATENT AND TRADEMARK OFFICE
CERTIFICATE OF CORRECTION

PATENT NO.        : 10,934,181 B2                               Page 1 of 1
APPLICATION NO.   : 14/852271
DATED             : March 2, 2021
INVENTOR(S)       : Brent R. Constantz It is certified that error appears in the above-identified patent and that said Letters Patent is hereby corrected as shown below:

In the Claims

Please replace "the data temperature control subsystem" in Claim 9 with -- the data center temperature control subsystem -- (Column 36, Lines 46-47).

Signed and Sealed this
First Day of June, 2021

Drew Hirshfeld
*Performing the Functions and Duties of the*
*Under Secretary of Commerce for Intellectual Property and*
*Director of the United States Patent and Trademark Office*